US012669459B2

(12) United States Patent
Dobbelaere et al.

(10) Patent No.: US 12,669,459 B2
(45) Date of Patent: Jun. 30, 2026

(54) ELECTRONIC DEVICE INCLUDING A SENSOR AND A METHOD OF USING THE SAME

(71) Applicant: SEMICONDUCTOR COMPONENTS INDUSTRIES, LLC, Scottsdale, AZ (US)

(72) Inventors: Wim Dobbelaere, Ninove (BE); Anthony B.G. Coyette, De Pinte (BE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 155 days.

(21) Appl. No.: 18/436,323

(22) Filed: Feb. 8, 2024

(65) Prior Publication Data

US 2025/0258123 A1     Aug. 14, 2025

(51) Int. Cl.
*G01N 27/20* (2006.01)

(52) U.S. Cl.
CPC ..................................... *G01N 27/20* (2013.01)

(58) Field of Classification Search
CPC ...................................................... G01N 27/20
See application file for complete search history.

(56) References Cited

U.S. PATENT DOCUMENTS

| | | | |
|---|---|---|---|
| 6,833,720 B1 | 12/2004 | Daubenspeck et al. | |
| 7,649,200 B1 | 1/2010 | Miller et al. | |
| 10,788,528 B2 | 9/2020 | Kwon et al. | |
| 11,342,234 B2 * | 5/2022 | Kim | G01N 21/9505 |
| 11,693,048 B2 | 7/2023 | Polomoff et al. | |
| 2005/0212147 A1 * | 9/2005 | Nishizawa | H01L 22/32 257/786 |
| 2008/0035923 A1 | 2/2008 | Tschmelitsch et al. | |

(Continued)

FOREIGN PATENT DOCUMENTS

| | | |
|---|---|---|
| DE | 102004028695 B3 | 12/2005 |
| DE | 102011005363 A1 | 9/2011 |

(Continued)

OTHER PUBLICATIONS

Pavlidis et al.; "SymBIST: Symmetry-Based Analog and Mixed-Signal Built-In Self-Test for Functional Safety", IEEE Transactions on Circuits and Systems I: Regular Papers; vol. 68, No. 6; 2021; pp. 2580-2593.

*Primary Examiner* — Feba Pothen

(74) *Attorney, Agent, or Firm* — Abel Schillinger, LLP

(57) ABSTRACT

In an aspect, an electronic device can include a first sensor adjacent to a first portion of a peripheral edge of a die, a first access transistor electrically coupled to the first sensor, a second sensor adjacent to a second portion of the peripheral edge, and a second access transistor electrically coupled to the second sensor. In another aspect, an electronic device can include an edge guard ring and a sensor electrically insulated from the edge guard ring. The edge guard ring can include a interconnect. At least a portion of the first sensor overlaps or underlaps a portion of the first interconnect. Testing can be performed by comparing the electrical parameters of two or more sensors or by comparing the electrical parameters of one sensor versus a reference value. Testing can be performed at nearly any time, including after the electronic device is installed in a system.

21 Claims, 9 Drawing Sheets

(56) References Cited

U.S. PATENT DOCUMENTS

| | | | |
|---|---|---|---|
| 2012/0032693 A1* | 2/2012 | Xue | G01R 31/2896 |
| | | | 257/773 |
| 2012/0049884 A1 | 3/2012 | Kaltalioglu | |
| 2013/0009663 A1 | 1/2013 | Gauch et al. | |
| 2017/0309530 A1 | 10/2017 | Ilkov | |
| 2019/0271739 A1 | 9/2019 | Werhane et al. | |
| 2020/0144139 A1 | 5/2020 | Munder et al. | |
| 2024/0222205 A1* | 7/2024 | Jeon | H01L 23/585 |

FOREIGN PATENT DOCUMENTS

| | | | | |
|---|---|---|---|---|
| DE | 102014107003 A1 | 11/2014 | | |
| DE | 102021130953 A1 | 5/2023 | | |
| KR | 20170042206 A * | 4/2017 | | H01L 23/585 |

* cited by examiner

ELECTRONIC DEVICE INCLUDING A SENSOR AND A METHOD OF USING THE SAME

FIELD OF THE DISCLOSURE

The present disclosure relates to electronic devices, and more particularly, to electronic devices that include sensors and methods of using the same.

RELATED ART

A die can include a sensor that is used to detect whether the die has a crack. The sensor is located near the edge of the die and extends along all sides of the die. In a particular design, a sensor can extend along the top and bottom sides of the die. The sensor can detect a crack in a die; however, the sensor cannot be used to locate the crack within the die. Extensive inspection analysis may be needed to locate the crack. Further improvement in analyzing die cracks is needed.

BRIEF DESCRIPTION OF THE DRAWINGS

Implementations are illustrated by way of example and are not limited in the accompanying figures.

Figure 1:
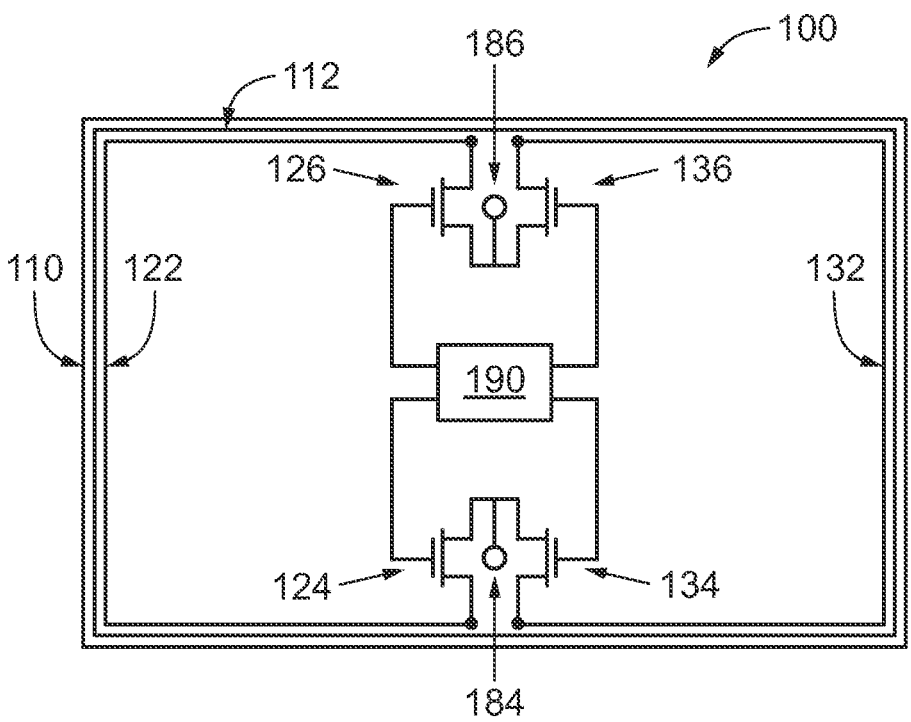
FIG. 1 includes an illustration of a conceptual view of a die that includes sensors adjacent to the peripheral edges of the die and circuits used with the sensors.

Skilled artisans appreciate that elements in the figures are illustrated for simplicity and clarity and have not necessarily been drawn to scale. For example, the dimensions of some of the elements in the figures may be exaggerated relative to other elements to help to improve understanding of implementations of the invention.

DETAILED DESCRIPTION

The following description in combination with the figures is provided to assist in understanding the teachings disclosed herein. The following discussion will focus on specific implementations and implementations of the teachings. This focus is provided to assist in describing the teachings and should not be interpreted as a limitation on the scope or applicability of the teachings. However, other implementations can be used based on the teachings as disclosed in this application.

As used in this specification, length and width are measured in directions along or parallel to a primary surface of a substrate or a semiconductor layer. Depth, height, and thickness are measured in directions perpendicular to the primary surface of the substrate or the semiconductor layer.

As used in this specification, length and width are measured in directions along or parallel to a major surface of a substrate or a semiconductor layer. Depth, height, and thickness are measured in directions perpendicular to the major surface of the substrate or the semiconductor layer.

The terms "horizontal," "lateral," and their variants are in directions along or parallel to a primary surface of a substrate or semiconductor layer, and the terms "vertical" and its variants are in directions perpendicular to a primary surface of the substrate or the semiconductor layer. Two objects that are laterally offset can be at the same or different elevations.

The terms "overlap," "underlap," and their variants refer to at least portions of regions or other features that lie along a vertical line that is perpendicular to a plane defined by a major surface. Components or features that overlap or underlap each other may or may not be in physical contact with each other.

For clarity of the drawings, certain regions of device structures, such as doped regions or dielectric regions, may be illustrated as having generally straight line edges and precise angular corners. However, those skilled in the art understand that, due to the diffusion and activation of dopants or formation of layers, the edges of such regions generally may not be straight lines and that the corners may not be precise angles.

The terms "on," "overlying," and "over" may be used to indicate that two or more elements are in direct physical contact with each other. However, "over" may also mean that two or more elements are not in direct contact with each other. For example, "over" may mean that one element is above another element, but the elements do not contact each other and may have another element or elements in between the two elements.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

The use of the word "about," "approximately," or "substantially" is intended to mean that a value of a parameter is close to a stated value or position. However, minor differences may prevent the values or positions from being exactly as stated. Such differences can be within manufacturing tolerance. Thus, differences of up to ten percent (10%) (and up to twenty percent (20%) for semiconductor doping concentrations) for the value are reasonable differences from the ideal goal of exactly as described.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the semiconductor and electronic arts.

An electronic device can include sensors that can be used to determine if a die has a crack. The sensors can be adjacent to different portions of a peripheral edge of the die. The sensors can be tested to obtain electrical parameters. The electrical parameters can be compared to a reference value or compared to each other. The result from the comparison can be used to determine whether or not a crack is adjacent to or extends through the sensor. In an implementation, a crack can be adjacent to the sensor where the crack overlaps or underlaps the sensor, or the crack is between the peripheral edge of the die and the sensor, where the sensor is nearer to the crack as compared to any other sensor. The testing can be performed very quickly and at nearly any time, including before packaging the die and many years after the electronic device including the die is installed within a system. The sensors can be used to locate more precisely where the crack is located. The location precision can be improved by increasing the number of sensors.

In an aspect, an electronic device can include a first sensor adjacent to a first portion of a peripheral edge of a die; a first access transistor electrically coupled to the first sensor; a second sensor adjacent to a second portion of the peripheral edge of the die; and a second access transistor electrically coupled to the second sensor. The first sensor can be different from the second sensor, and the first portion and the second portion are different portions of the peripheral edge of the die. The electronic device can be adapted such that when the first access transistor is on and the second access transistor is off, current flows through the first sensor and no current flows through the second sensor, and when the second access transistor is on and the first access transistor is off, current flows through the second sensor and no current flows through the first sensor. As used herein, no current corresponds to no more than leakage current through a transistor when the transistor is off.

In another aspect, an electronic device can include an edge guard ring and a sensor electrically insulated from the edge guard ring. The edge guard ring can include an interconnect. The sensor can include a first terminal tab, a second terminal tab, and a sensor section extending from the first terminal tab to the second terminal tab. At least a portion of the interconnect can overlap or underlap at least a portion of sensor section of the sensor.

In a further aspect, a method can include obtaining a first electrical parameter associated with a first sensor while a first access transistor is on and a second access transistor is off. The first sensor can be adjacent to a first portion of a peripheral edge of a die, and the first access transistor can be electrically coupled to the first sensor and is not electrically connected to a second sensor. The second sensor can be adjacent to a second portion of the peripheral edge of the die, and the second access transistor can be electrically coupled to the second sensor and may not be electrically connected to the first sensor. The method also includes obtaining a second electrical parameter associated with the second sensor while the second access transistor is on and the first access transistor is off. The method further includes determining whether or not a first crack in the die is adjacent to or extends through the first sensor or whether or not a second crack in the die is adjacent to or extends though the second sensor.

FIG. 1 includes a conceptualized top view of a die 100 that includes sensors 122 and 132 that are adjacent to a peripheral edge 110 of the die 100. Each of the sensors 122 and 132 has a sensor portion that extends between the black dots in FIG. 1. The sensors 122 and 132 have tabs that extend between the sensor sections and associated access transistors. For example, the sensor 122 has a tab that extends from the black dot near the top of FIG. 1 to a current-carrying terminal (for example, a drain, a source, or a drain/source) of an access transistor 126, and another tab that extends from the black dot near the bottom of FIG. 1 to a current-carrying terminal of an access transistor 124. The sensor 132 has a tab that extends from the black dot near the top of FIG. 1 to a current-carrying terminal of the access transistor 136, and another tab that extends from the black dot near the bottom of FIG. 1 to a current-carrying terminal of the access transistor 134.

In FIG. 1, the sensors 122 and 132 are U-shaped sensors. The sensor 122 extends along the top left-hand portion of the peripheral edge 110 of the die 100, along the left-hand peripheral edge 110, and along the bottom left-hand portion of the peripheral edge 110. The sensor 132 extends along the top right-hand portion of the peripheral edge 110 of the die 100, along the right-hand peripheral edge 110, and along the bottom right-hand portion of the peripheral edge 110.

An edge guard ring 112 is located between the peripheral edge 110 and the sensors 122 and 132. From a top view, the die 100 can have a length dimension and a width dimension, wherein the length dimension is the same as or greater than the width dimension. At least the sensor sections of the sensors 122 and 132 can be distances from the peripheral edge 110 of the die, wherein the distances are at most 9% of the width dimension.

In the implementation illustrated in FIG. 1, the edge guard ring 112 does not overlap either of the sensors 122 and 132. In another implementation, the edge guard ring 112 can overlap or underlap at least a portion of the sensor 122 or the sensor 132 or portions of both sensors.

The sensors 122 and 132 can be substantially identical to each other. The sensors 122 and 132 can have substantially the same sheet resistivity and the same length along a conduction path between corresponding access transistors. Due to some variation during manufacturing, the sheet resistivities for the sensors 122 and 132 may not be equal, and the lengths of the sensors 122 and 132 may not be equal. In an implementation, the length of the sensor 122 between its terminals is within 5% of the length of the sensor 132 between its terminals. In the same or different implementation, the sheet resistance of the sensor 122 is within 5% of the sheet resistance of the sensor 132.

The die can further include access transistors 134 and 136, terminals 184 and 186, and a controller 190. The access transistors 124, 126, 134, and 136 can be n-channel insulated gate field-effect transistors (IGFETs) or p-channel IGFETs. In another implementation, the access transistors 124, 126, 134, and 136 can be junction field-effect transistors or bipolar junction transistors. As illustrated in FIG. 1, the access transistors 124, 126, 134, and 136 are n-channel IGFETs. The controller 190 is electrically coupled to the control electrodes for the access transistors 124, 126, 134, and 136.

The controller 190 can control the operation of the access transistors 124, 126, 134, and 136. In an implementation, the access transistors 124, 126, 134, and 136 are normally off, for example, enhancement mode n-channel IGFETs. The controller 190 can provide a voltage to the gate of an access transistor, where the voltage is sufficient to turn on the access transistor (gate-to-source voltage is greater than the threshold voltage for access transistor, or $V_{GS} > V_{TH}$). The controller 190 can turn off the access transistor by taking $V_{GS}$ to 0 V or a negative voltage.

A current-carrying terminal of the access transistor 124 can be electrically coupled to the sensor 122, and another current-carrying terminal of the access transistor 124 can be electrically coupled to the terminal 184. A current-carrying terminal of the access transistor 126 can be electrically coupled to the sensor 122, and another current-carrying terminal of the access transistor 126 can be electrically coupled to the terminal 186. A current-carrying terminal of the access transistor 134 can be electrically coupled to the sensor 132, and another current-carrying terminal of the access transistor 134 can be electrically coupled to the terminal 184. A current-carrying terminal of the access transistor 136 can be electrically coupled to the sensor 132, and another current-carrying terminal of the access transistor 136 can be electrically coupled to the terminal 186. The terminals 184 and 186 can be electrically coupled to the controller 190, one or more circuits elsewhere within the die 100, or one or more circuits external to the die 100.

Figure 2:
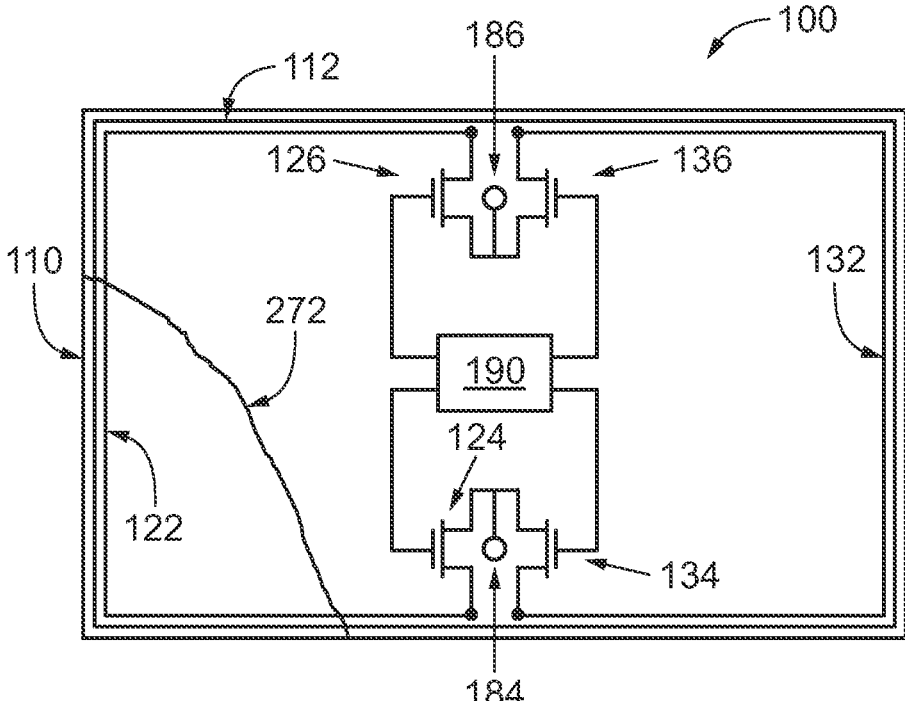
FIG. 2 includes an illustration of a top view of the die in FIG. 1 illustrating a crack adjacent to or extending through one of the sensors.

FIG. 2 includes the die 100 and has a crack 272 adjacent to or extending through the sensor 122. No crack is near the sensor 132. Each of the sensors 122 and 132 are designed to have a particular resistance when no crack is present within the die 100. The crack 272 can distort the sensor 122 or may cause the sensor 122 to become discontinuous between the access transistors 124 and 126. When testing the sensor 122 and the access transistors 124 and 126 are on, a voltage drop between the terminals 184 and 186 or a resistance between the terminals 184 and 186 can be substantially higher than the particular resistance. In the discussion below, the testing of the sensor 132 (no crack) is addressed before the sensor 122 (crack adjacent to or extending through the sensor 122).

In one technique, current can be injected into a sensor and an electrical parameter can be obtained. The electrical parameter can be a voltage drop between the terminals 184 and 186. If needed or desired, the electrical parameter can be a resistance between the terminals 184 and 186 that can be obtained by dividing the voltage drop by the current.

Before testing the sensors, the terminal 186 is placed at a voltage, for example, $V_{SS}$ or ground. A current source can inject a current into the terminal 184. The controller 190 can turn on the access transistors 124 and 126 while the access transistors 134 and 136 are off. Current flows from the terminal 184, through the access transistor 124, the sensor 122, and the access transistor 126 and to the terminal 186. An electrical parameter can be obtained, and the electrical parameter can be a voltage drop between the terminals 184 and 186. For the sensor 132, the controller 190 can turn off the access transistors 124 and 126 and turn on the access transistors 134 and 136. Current flows from the terminal 184, through the access transistor 134, the sensor 132, and the access transistor 136 and to the terminal 186. An electrical parameter can be obtained, and the electrical parameter can be a voltage drop between the terminals 184 and 186.

During analysis of the electrical parameters, the voltage drops for the sensors 122 and 132 can be compared to each other. The sensors 122 and 132 can be substantially identical to each other. In an implementation, the sheet resistance of the sensor 122 can be within 5% of the sheet resistance of the sensor, and the length of the sensor 122 can be within 5% of the length of the sensor 132. In a particular implementation, the sheet resistances can be within 1% of each other, and the lengths can be within 1% of each other. In a more particular implementation, the sheet resistances can be within 0.1% of each other, and the lengths can be within 0.1% of each other because the sensors 122 and 132 are substantially identical.

Any of the electrical parameters for the sensors 122 and 132 can be compared to determine if a crack extends through one of the sensors (hereinafter called "the comparison technique"). The determination of whether or not a crack is present using the comparison technique can be determined by the following formula: $(EP_{lrg} - EP_{sm})/EP_{sm}$, (Equation 1) where $EP_{lrg}$ is the larger value for the electrical parameter associated with one of the sensors, and $EP_{sm}$ is the smaller value for the electrical parameter associated with the other sensor. The comparison of electrical parameters of the sensors 122 and 132 can be used to determine that a crack is adjacent to or extends through the one of the sensors. In an implementation, a crack can be adjacent to the sensor 122 or 132 where the crack overlaps or underlaps the sensor 122 or 132, or the crack is between the peripheral edge of the die and the sensor 122 or 132, where the sensor 122 or 132 is nearer to the crack as compared to other sensor.

The electrical parameter will be of the same type for both sensors 122 and 132. The electrical parameter for both sensors 122 and 132 can be measured voltage drops, measured currents, or actual resistances (derived from measured voltage drops or measured currents). If the quotient from Equation 1 is greater than 1.05 (>5% difference), a crack is adjacent to or extends through one of the sensors. As an example, the sensor 122 has a greater measured voltage drop, a greater actual resistance, or a measured current as compared to the sensor 132. Using the voltage drop for the electrical parameter in Equation 1, $(\Delta V_{122}-\Delta V_{132})/\Delta V_{132}>1.05 \Rightarrow$ crack is adjacent to or extends through the sensor 122, where $\Delta V_{122}$ is the measured voltage drop for the sensor 122, and $\Delta V_{132}$ is the measured voltage drop for the sensor 132. In another implementation, 1.05 could be replaced by a higher or lower number after characterization of the actual process variation. If desired, the threshold value for the quotient can be lowered from 1.05 (>5% difference) to 1.01 (>1% difference) or even 1.001 (>0.1% difference) because the sensors 122 and 132 are substantially identical to each other.

A similar analysis can be performed using resistance. The actual resistance associated with a sensor can be the measured voltage drop between the terminals 184 and 186 divided by the current provided by the current source. Using the actual resistance for the electrical parameter in Equation 1, $(R_{122}-R_{132})/R_{132}>1.05 \Rightarrow$ crack is adjacent to or extends through the sensor 122, where $R_{122}$ is the actual resistance associated with the sensor 122, and $R_{132}$ is the actual resistance associated with the sensor 132. In another implementation, 1.05 could be replaced by a higher or lower number after characterization of the actual process variation. If desired, the threshold value for the quotient can be lowered from 1.05 (>5% difference) to 1.01 (>1% difference) or even 1.001 (>0.1% difference) because the sensors 122 and 132 are substantially identical to each other.

In another testing technique, the terminals 186 and 184 can be electrically coupled to different voltage supplies. For example, the terminal 186 may be at $V_{SS}$ or ground, and the terminal 184 may be at $V_{DD}$ or another voltage higher than $V_{SS}$ or ground. The controller 190 can turn on the access transistors 124 and 126 while the access transistors 134 and 136 remain off. Current flows from the terminal 184, through the access transistor 124, the sensor 122, through the access transistor 126 to the terminal 186. The current flowing through the sensor 122 can be measured. The location for measuring the current may be at the sensor 122 itself, through the access transistor 126, the terminal 186, or another location along the current path. For the sensor 132, the controller 190 can turn off the access transistors 124 and 126 and turn on the access transistors 134 and 136. Current flows from the terminal 184, through the access transistor 134, the sensor 132, through the access transistor 136 to the terminal 186. The current flowing through the sensor 132 can be measured. The location for measuring the current may be at the sensor 132 itself, through the access transistor 136, the terminal 186, or another location along the current path.

In this example, the electrical parameter is measured current flowing through the sensors 122 and 132. More current can flow through the sensor 132 as compared to the sensor 122 because the crack is associated with the sensor 122. Using measured current for the electrical parameter in Equation 1, $(I_{132}-I_{122})/I_{122}>1.05 \Rightarrow$ crack is adjacent to or extends through sensor 122, where $I_{122}$ is the measured current for the sensor 122, and $I_{132}$ is the measured current for the sensor 132. In another implementation, 1.05 could be replaced by a higher or lower number after characterization of the actual process variation. If desired, the threshold value for the quotient can be lowered from 1.05 (>5% difference)

to 1.01 (>1% difference) or even 1.001 (>0.1% difference) because the sensors 122 and 132 are substantially identical to each other.

A similar analysis can be performed using resistance. The actual resistance associated with each of the sensors 122 and 132 can be the voltage difference between the terminals 184 and 186 divided by the measured current associated with the sensor. The comparison technique for the actual resistances can be performed as described above.

The comparison technique provides flexibility, as measured voltage drops, actual resistances, or measured currents can be used. The analysis using the comparison technique can be very sensitive to the presence of cracks and may allow detection of a crack that other analysis technique would otherwise miss. The measurement accuracy of the comparison technique is optimal as systematic deviations of the sensor parameters and systematic measurement errors associated with sensors being compared are cancelled out.

Another technique for performing the analysis of the electrical parameter can be used as an alternative or in conjunction with the comparison technique. When the electrical parameters for the sensors 122 and 132 are compared, a false positive (determination that no crack is present when an actual crack is adjacent to or extends through a sensor) may occur. For example, a crack may extend through the sensors 122, and the same crack or a different crack (not illustrated in FIG. 2) may be adjacent to the sensor 132. The crack extending through the sensor 122 may be relatively large, and the sensor 122 is discontinuous between the access transistors 124 and 126. The resistance associated with the sensor 122 will be extremely high and can exceed 1 Gohm.

A relatively smaller crack can be adjacent to the sensor 132. The sensor 132 may be distorted but still allows some current to flow through the sensor 132. The resistance associated with the sensor 132 will be high relative to a sensor with no crack but the resistance may be no more than 1 Mohm. Thus, for the comparison technique, Equation 1 using resistances, ((1 Gohm−1 Mohm)/1 Mohm) provides a quotient that is greater than 1.05. The sensor 122 is correctly identified as having a crack. However, the sensor 132 may be incorrectly identified as not having a crack because $R_{132}$ is significantly less than $R_{122}$, even through $R_{132}$ has a value substantially higher than if no crack was associated with the sensor 132.

An electrical parameter analysis technique based on comparing an electrical parameter to a reference value (hereinafter called "the reference parameter technique") can provide a different analytical technique that can be used as an alternative to or in conjunction with the comparison technique. The reference parameter technique may have issues that are not present within the comparison technique. For example, the electrical parameter (voltage drop, resistance, or current) obtained from testing a sensor may have a systematic error. The systematic error may include on-state resistance through the access transistors, resistance associated with wiring between the access transistors and each of the sensors and terminals, and the like. The systematic error can be cancelled out in the comparison technique because the comparison technique uses the difference in electrical parameters for the sensors. Thus, the reference parameter technique may not be as sensitive in detecting a crack as the comparison technique because the reference parameter technique does not remove the systematic error.

Accordingly, a higher threshold value may be used with the reference parameter technique to determine whether a crack is adjacent to or extends through a sensor to account for the systematic error. Just like the comparison technique, the reference parameter technique can be based on a voltage drop, a resistance, or a current. The reference parameter for determining whether or not a crack is adjacent to or extends through the sensor may be 9% higher than (1.09 times) the expected reference parameter. The expected parameter for a sensor can be based on the design information for the electronic device. Such information can include the design specifications for the sheet resistivity and lengths of the sensors.

If the systematic error is known or can be measured, the systematic error may be added to the expected parameter to achieve the reference parameter. Many times, cracks are introduced during or after singulation. In an implementation, a die can pass its other electrical tests (for example, no detected electrical short or open circuit), and the sensors 122 and 132 can be tested before a wafer is singulated into individual die. The electrical parameter before singulation can be obtained for each sensor and stored within the die or external to the die and used as the reference parameter. In a particular implementation, the pre-singulation electrical parameters for the sensors 122 and 132 can be stored within flash memory of the die as the reference parameters for the sensors.

An electrical parameter for the sensor 122 or 132 obtained any time after singulation can be compared to reference parameter, which can be the pre-singulation electrical parameter for the same sensor. The same testing protocol will be used for the pre-singulation and post-singulation testing. If a built-in self test (BIST) technique is used for post-singulating testing, then the BIST technique should be used for the pre-singulation testing. If testing equipment external to the die is used for post-singulating testing, then the same testing equipment external to the die should be used for the pre-singulation testing. The analysis of the electrical parameters, whether using the comparison technique or the reference parameter technique, may be performed within or external to the die.

In view of the issues with the reference parameter technique, such as the systematic error, the reference parameter for determining whether or not a crack is adjacent to or extends through the sensor may be 20% higher than (1.2 times) the expected parameter or even higher. In another implementation, the reference parameter may be 200% higher than (2 times) the expected parameter in a situation where systematic or other error is relatively high.

The measured voltage drops for the sensors 122 and 132 can be obtained as previously described. Each of the measured voltage drops can be compared to a reference voltage drop. The measured voltage drop for the sensor 122 is substantially higher than the reference voltage drop, and a determination can be made that a crack is adjacent to or extends through the sensor 122. The measured voltage drop for the sensor 132 is less than the reference voltage drop, and a determination can be made that a crack is not adjacent to or does not extend through the sensor 132. When the reference parameter technique is used in conjunction with the comparison technique, the reference parameter technique may be performed only on the sensor 132 because the comparison technique is used to determine that a crack is adjacent to or extends through the sensor 122.

A similar analysis can be performed using resistance or current. The actual resistance associated with a sensor can be the voltage drop between the terminals 184 and 186 divided by the current provided by the current source. In another implementation, a voltage between the terminals 184 and 186 can be coupled to constant voltage supplies, and the current associated with each of the sensor 122 and 132 can be measured. The actual resistance associated with a sensor can be the voltage difference between the terminals 184 and 186 divided by the measured current for that sensor. The actual resistances can be compared to a reference resistance in a manner similar to the voltage drops. The measured currents can be compared to a reference current in a manner similar to the voltage drops. Similar to a prior implementation, the comparison technique may have already identified the sensor 122 as having an associated crack, and the reference parameter technique for actual resistance or measured current may be performed for only the sensor 132.

At this point in the process, a crack has been determined to be adjacent to or extend through the sensor 122; however, the precise location of the crack relative to the sensor 122 is not known. A crack does not extend through the sensor 132, and thus, the right-hand side of the die 100 does not need to be inspected for a crack. Therefore, the entire die 100 does need to be inspected; only the left-hand side of the die 100 may be inspected for the crack 272. Thus, the crack 272 can be located more quickly using the sensors 122 and 132 as compared to a single continuous sensor. The location precision can be improved by increasing the number of sensors.

The previously described methods can be performed internally within the die or one or both of the terminals 184 and 186 can be coupled to external test equipment. When analyzing the electrical parameter, such analysis can be performed by the controller 190 or by a circuit outside the controller 190 but still within the die 100. When the tests for the sensors 122 and 132 are performed within the die 100, the test can be performed in less than 100 µs. When the tests for the sensors 122 and 132 are performed using a circuit outside the die 100, the test may take approximately 10 ms. Thus, a built-in self test (BIST) methodology can be performed very quickly. If the circuits or other structures within the die 100 do not allow for the BIST methodology, the analysis outside the die 100 is an adequate alternative.

Figure 3:
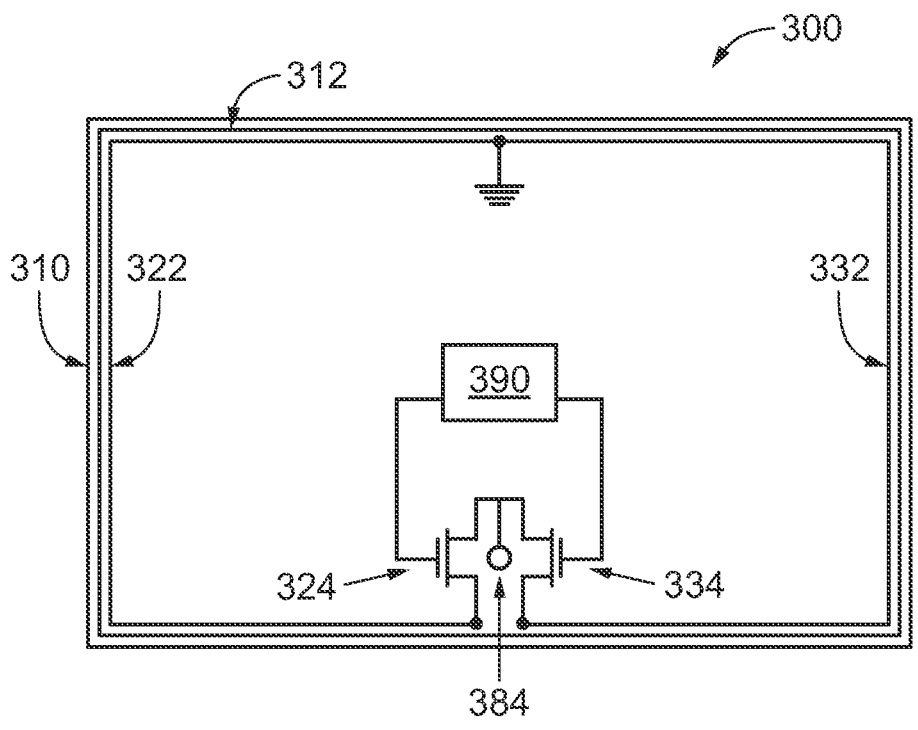
FIG. 3 includes an illustration of a conceptual view of a die that includes sensors adjacent to the peripheral edges of the die and circuits used with the sensors in accordance with an alternative implementation.

Other designs can be used. FIG. 3 includes a die 300 that has a peripheral edge 310 and an edge guard ring 312. The peripheral edge 310 and the edge guard ring 312 can have any of the design considerations as previously described with respect to the peripheral edge 110 and edge guard ring 112. The die 300 includes sensors 322 and 332, access transistors 324 and 334, a terminal 384, and a controller 390. The access transistors 126 and 136 and the terminal 186 of the die 100 in FIG. 1 are not present within the die 300. The sensors 322 and 332 can have terminals coupled to a voltage source or ground. FIG. 3 illustrates the sensors 322 and 332 coupled to ground. In another implementation, the sensors 322 and 332 may be coupled to $V_{DD}$, $V_{SS}$, or another voltage source. The sensors 322 and 332 are U-shaped sensors and can have any of the designs as previously described with respect to the sensors 122 and 132. The access transistors 324 and 334, the terminal 384, and the controller 390 can have any of the designs as previously described with respect to the transistors 124, 134, the terminal 184, and the controller 190, respectively.

Figure 4:
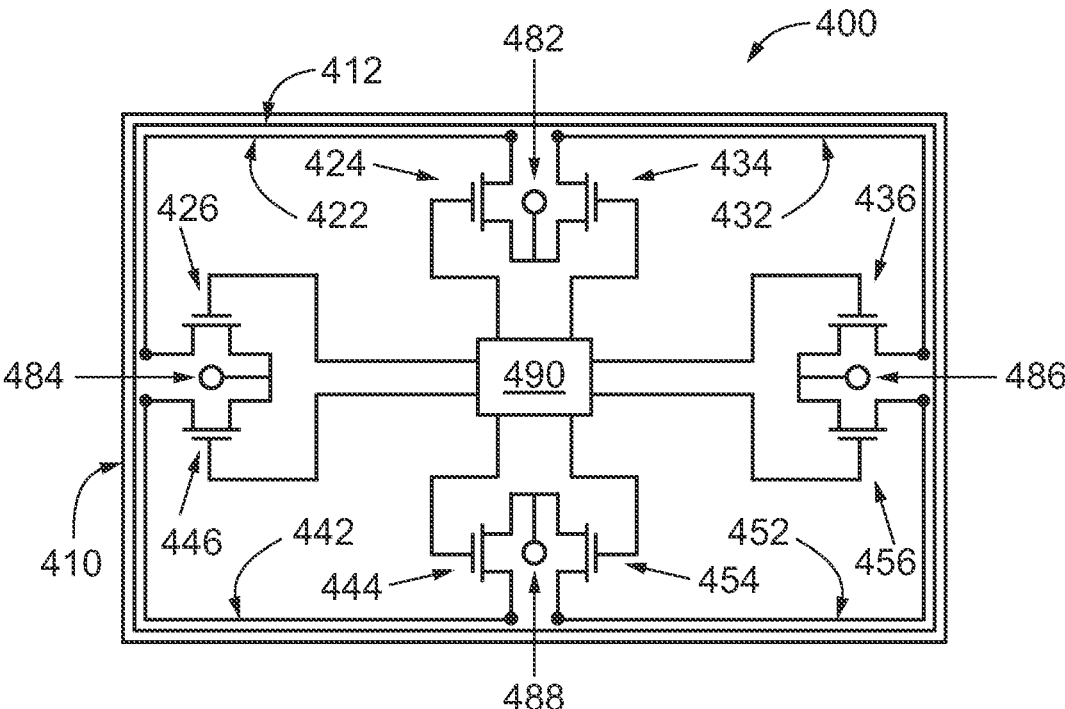
FIG. 4 includes an illustration of a conceptual view of a die that includes sensors adjacent to the peripheral edges of the die and circuits used with the sensors, wherein the die has more sensors as compared to the die in FIG. 1.

In an alternative implementation, more sensors may be used. FIG. 4 includes sensors 422, 432, 442, and 452. The larger number of sensors may help to locate more precisely where a crack or cracks are located. Further, the likelihood of cracks being adjacent to or extending through all four sensors is very small. Thus, the comparison technique can be used with greater confidence as compared to a die having only two sensors, such as illustrated in FIG. 1. When more than two sensors are within a die, the reference parameter technique may not be used. In another implementation, the reference parameter technique may be used as an alternative to the comparison technique if desired.

FIG. 4 includes a conceptualized top view of a die 400 that includes the sensors 422, 432, 442, and 452 that are adjacent to a peripheral edge 410 of the die 400. Each of the sensors 422, 432, 442, and 452 has a sensor portion that extends between the black dots in FIG. 4. The sensors 422, 432, 442, and 452 have tabs that extend between the sensor sections and associated access transistors. For example, the sensor 422 has a tab that extends from the black dot near the top of FIG. 4 to a current-carrying terminal of the access transistor 424, and another tab that extends from the black dot along the left-hand side of FIG. 4 to a current-carrying terminal of the access transistor 426. The sensor 432 has a tab that extends from the black dot near the top of FIG. 4 to a current-carrying terminal of the access transistor 434, and another tab that extends from the black dot along the right-hand side of FIG. 4 to a current-carrying terminal of the access transistor 436. The sensor 442 has a tab that extends from the black dot near the bottom of FIG. 4 to a current-carrying terminal of the access transistor 444, and another tab that extends from the black dot along the left-hand side of FIG. 4 to a current-carrying terminal of the access transistor 446. The sensor 452 has a tab that extends from the black dot near the bottom of FIG. 4 to a current-carrying terminal of the access transistor 454, and another tab that extends from the black dot along the right-hand side of FIG. 4 to a current-carrying terminal of the access transistor 456.

In FIG. 4, the sensors 422, 432, 442, and 452 are L-shaped sensors. The sensor 422 extends along the left-hand top portion of the peripheral edge 410 of the die 400 and along the upper left side portion of the peripheral edge 410. The sensor 432 extends along the top right-hand top portion of the peripheral edge 410 and along the upper right side portion of the peripheral edge 410. The sensor 442 extends along the left-hand bottom portion of the peripheral edge 410 and along the lower left side portion of the peripheral edge 410. The sensor 452 extends along the right-hand bottom portion of the peripheral edge 410 and along the lower right side portion of the peripheral edge 410.

An edge guard ring 412 is located between the peripheral edge 410 and the sensors 422, 432, 442, and 452. From a top view, the die 400 can have a length dimension and a width dimension, wherein the length dimension is the same as or greater than the width dimension. At least the sensor sections of the sensors 422, 432, 442, and 452 can be distances from the peripheral edge 410 of the die, wherein the distances are at most 9% of the width dimension.

In the implementation illustrated in FIG. 4, the edge guard ring 412 does not overlap any of the sensors 422, 432, 442, and 452. In another implementation, the edge guard ring 412 can overlap or underlap at least a portion of the sensor 422, 432, 442, 452 or portions of any combination of the sensors.

The sensors 422, 432, 442, and 452 can be substantially identical to each other. The sensors 422, 432, 442, and 452 can have substantially the same sheet resistivity and the same length along a conduction path between corresponding access transistors. Due to some variation during manufacturing, the sheet resistivities for any pair of the sensors 422, 432, 442, and 452 may not be equal, and the lengths for any pair of the sensors 422, 432, 442, and 452 may not be equal. In an implementation, the length of any one of the sensors 422, 432, 442, and 452 between its terminals is within 5% of the length of any of the other sensors between their terminals. In the same or different implementation, the sheet resistance of any one of the sensors 422, 432, 442, and 452 is within 5% of the sheet resistance of the other sensors. In a particular implementation, the sheet resistances can be within 1% of each other, and the lengths can be within 1% of each other. In a more particular implementation, the sheet resistances can be within 0.1% of each other, and the lengths can be within 0.1% of each other because the sensors 422, 432, 442, and 452 are substantially identical.

The die can further include access transistors 424, 426, 434, 436, 444, 446, 454, and 456, terminals 482, 484, 486 and 488, and a controller 490. The access transistors 424, 426, 434, 436, 444, 446, 454, and 456 can be n-channel IGFETs or p-channel IGFETs. In another implementation, the access transistors 424, 426, 434, 436, 444, 446, 454, and 456 can be junction field-effect transistors or bipolar junction transistors. As illustrated in FIG. 4, the access transistors 424, 426, 434, 436, 444, 446, 454, and 456 are n-channel IGFETs.

The controller 490 is electrically coupled to the control electrodes for the access transistors 424, 426, 434, 436, 444, 446, 454, and 456. The controller 490 can control the operation of the access transistors 424, 426, 434, 436, 444, 446, 454, and 456. In an implementation, the access transistors 424, 426, 434, 436, 444, 446, 454, and 456 are normally off, for example, enhancement mode n-channel IGFETs. The controller 490 can provide a voltage to the gate of an access transistor, where the voltage is sufficient to turn on the access transistor ($V_{GS} > V_{TH}$). The controller 190 can turn off the access transistor by taking $V_{GS}$ to 0 V or a negative voltage.

A current-carrying terminal of the access transistor 424 can be electrically coupled to the sensor 422, and another current-carrying terminal of the access transistor 424 can be electrically coupled to the terminal 482. A current-carrying terminal of the access transistor 426 can be electrically coupled to the sensor 422, and another current-carrying terminal of the access transistor 426 can be electrically coupled to the terminal 484. A current-carrying terminal of the access transistor 434 can be electrically coupled to the sensor 432, and another current-carrying terminal of the access transistor 434 can be electrically coupled to the terminal 482. A current-carrying terminal of the access transistor 436 can be electrically coupled to the sensor 432, and another current-carrying terminal of the access transistor 436 can be electrically coupled to the terminal 486.

A current-carrying terminal of the access transistor 444 can be electrically coupled to the sensor 442, and another current-carrying terminal of the access transistor 444 can be electrically coupled to the terminal 488. A current-carrying terminal of the access transistor 446 can be electrically coupled to the sensor 442, and another current-carrying terminal of the access transistor 446 can be electrically coupled to the terminal 484. A current-carrying terminal of the access transistor 454 can be electrically coupled to the sensor 452, and another current-carrying terminal of the access transistor 454 can be electrically coupled to the terminal 488. A current-carrying terminal of the access transistor 456 can be electrically coupled to the sensor 452, and another current-carrying terminal of the access transistor 456 can be electrically coupled to the terminal 486.

Any or all of the terminals 482, 484, 486, and 488 can be electrically coupled to the controller 490, one or more circuits elsewhere within the die 400, or one or more circuits external to the die 400.

Figure 5:
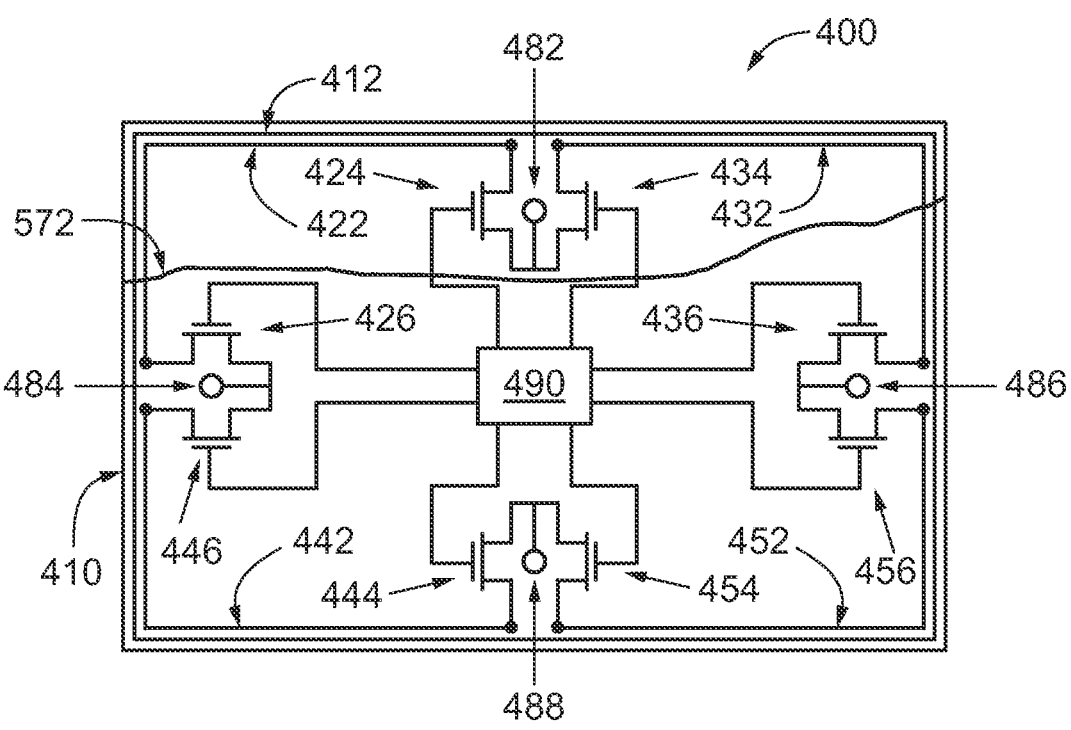
FIG. 5 includes an illustration of a top view of the die in FIG. 4 illustrating a crack adjacent to or extending through some, but not all, of the sensors.

FIG. 5 includes the die 400 and has a crack 572 adjacent to or extending through the sensors 422 and 432. No crack is adjacent to or extends through the sensor 442 or 452. Each of the sensors 422, 432, 442, and 452 are designed to have a particular resistance when no crack is present within the die 400. The crack 572 can distort the sensors 422 and 432 or may cause the sensor 422, 432, or both sensors to become discontinuous between their corresponding access transistors. When testing the sensor 422 or 432 and its corresponding access transistors 424 and 426 or 434 and 436 are on, a voltage drop between the corresponding terminals for each of the sensors or a resistance between the corresponding terminals for each of the sensors 422 and 432 can be substantially higher than the voltage drop or resistance if such sensor would not have a crack adjacent or extending through such sensor.

Any of the testing techniques (injecting current or coupling corresponding terminals to power supplies) for the sensors 122 and 132 can be used when testing the sensors 422, 432, 442, and 452. Any of the analytical techniques using one or more electrical parameters can be used to determine whether or not a crack is adjacent to or extends through the sensors 122 and 132 can be used when analyzing the sensors 422, 432, 442, and 452. In an implementation, a crack can be adjacent to the sensor 422, 432, 442, and 452 where the crack overlaps or underlaps the sensor 422, 432, 442, and 452, or the crack is between the peripheral edge of the die and the sensor 422, 432, 442, and 452, where the sensor 422, 432, 442, and 452 is nearer to the crack as compared to other sensor.

The analysis for the die 400 indicates that a crack is adjacent to or extends through the sensor 422, the same or a different crack is adjacent to or extends though the sensor 432, and no crack is adjacent to or extends through each of the sensors 442 and 452. The analysis may not provide information on whether the same crack or different cracks are adjacent to or extend through the sensors 422 and 432. An inspection can be used to determine that the crack 572 is adjacent to or extends through both of the sensors 422 and 432. Similar to the die 100, not all of the die 400 needs to be inspected because the analysis indicates that no crack is adjacent to or extends through each of the sensors 442 and 452.

The time for performing the tests of the sensors 422, 432, 442, and 452 can be substantially the same as previously described with respect to the sensors 122 and 132. The implementation as illustrated in FIG. 4 can allow for testing of more than one sensor at a time. The sensor 422 is electrically coupled to the terminals 482 and 484, and the sensor 452 is electrically coupled to the terminals 486 and 488. Thus, the testing of the sensor 422 and 452 can be performed during at least a portion of the time when the sensors 422 and 452 are being tested. In a particular implementation, the sensors 422 and 452 can be tested simultaneously. The sensor 432 is electrically coupled to the terminals 482 and 486, and the sensor 442 is electrically coupled to the terminals 484 and 488. Thus, the testing of the sensor 432 and 442 can be performed during at least a same portion of the time when the sensors 432 and 442 are being tested. In a particular implementation, the sensors 432 and 442 can be tested simultaneously. Therefore, testing the sensors 422, 432, 442, and 452 of the die 400 in FIG. 4 can be performed for the same amount of time as testing the sensors 122 and 132 of the die 100 in FIG. 1.

In another implementation, some of the access transistors can be removed from the die 400, and corresponding terminals may be electrically coupled to a voltage source similar to the implementation as illustrated and previously described with respect to the die 300 in FIG. 3.

Figure 6:
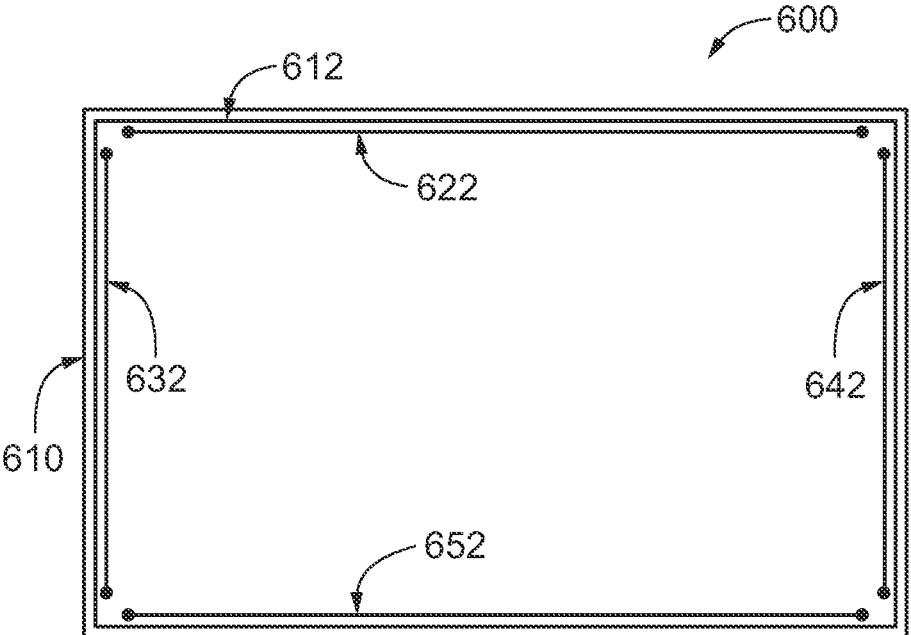
FIG. 6 includes an illustration of a conceptual view of a die that includes sensors adjacent to the peripheral edges of the die in accordance with an alternative implementation.

All of the sensors do not need to be substantially identical to one another in all implementations. FIG. 6 illustrates a die

600 that includes sensors 622, 632, 642, and 652 that have any of the positional relationships to the peripheral edge 610 and the edge guard ring 612, dimensions, sheet resistivities, and compositions of the other sensors as previously described. Although not illustrated, the die 600 can include access transistors, terminals, and a controller similar to FIG. 4. Other than length, the sensors 622, 632, 642, and 652 can be substantially identical to one another and be within the previously described tolerances with respect to dimensions (other than length), sheet resistances, and material composition.

The sensors 622 and 652 can have substantially the same lengths along their conduction paths, and the sensors 632 and 642 can have substantially the same lengths along their conduction paths. The sensors 622 and 652 can have lengths along conduction paths that are within 5% of each other, and the sensors 632 and 642 can have lengths along conduction paths that are within 5% of each other. In a particular implementation, the lengths of the sensors 622 and 652 can be within 1% of each other, and the lengths of the sensors 642 and 632 can be within 1% of each other. In a more particular implementation, the lengths of the sensors 622 and 652 can be within 0.1% of each other because the sensors 622 and 652 are substantially identical to each other, and the lengths of the sensors 642 and 632 can be within 0.1% of each other because the sensors 632 and 642 are substantially identical to each other. Each of sensors 622 and 652 can have a significantly different length along its conduction path as compared to each the sensors 632 and 642. Each of sensors 622 and 652 can have a length along its conduction path that is more than 5% different from the lengths along conduction paths for each of the sensors 632 and 642.

The test methodologies previously described can be performed on the sensors 622, 632, 642, and 652. For analyzing using the comparison technique, the sensors 622 and 652 can be compared to each other, and the sensors 632 and 642 can be compared to each other. Either or both of the sensors 622 and 652 may or may not be compared to either or both of the sensors 632 and 642. An electrical parameter for the sensor 622 or 652 may not be compared to an electrical parameter of the sensor 632 or 642 due to the length difference along current paths. However, in an implementation, the electrical parameters may be compared if the electrical parameter is adjusted for the length difference. For example, the lengths along conduction paths for the sensors 632 and 642 may be 0.6 times the lengths along conduction paths for the sensors 622 and 652. The resistances may be used if the resistance of the sensor 622 or 652 is multiplied by 0.6 or if the resistance of the sensor 632 or 642 is multiplied by 1.67 (1/0.6) to accommodate the length difference.

Adding more sensors and access transistors can help to locate more precisely crack(s) near the peripheral edge of a die. However, too many sensors and their corresponding access transistors may occupy too much area of the die. For example, 1000 sensors and their corresponding access transistors in a die may be theoretically possible; however, a larger die may be needed for the other circuits or structures of the die, or the number of other circuits, structures, or both may be reduced in number if the size of the die is to remain the same. After reading this specification, skilled artisans will be able to determine the number of sensors and corresponding access transistors to be used.

Figure 7:
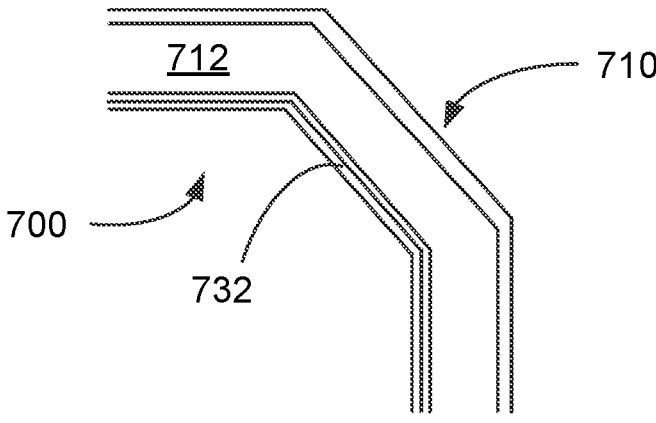
FIG. 7 includes an illustration of a top view of an enlarged portion of the die in FIG. 4 near a corner of the die.

In the previous drawings, the dies 100, 300, 400, and 600 are illustrated as rectangles with corners at right angles (90°). In another implementation, the corners may have different shapes. FIG. 7 includes an enlarged view of a portion of a die 700 with a chamfered corner. The edge guard ring 712 is located between a peripheral edge 710 and a sensor 732. The edge guard ring 712 and the sensor 732 have substantially the same shape as the chamfered corner along the peripheral edge 710. In another implementation, the corner may have another shape, such as rounded. Any of the dies 100, 300, 400, and 600 can have chamfered corners as illustrated in FIG. 7 or corners with other shapes.

The locations and sizes of the access transistor and their corresponding controller may be kept relatively small to allow for more area to be occupied by other circuits and structures that are used in the normal operation of the die. Ideally, the controller and the access transistors may be near the center of the die, so that the access transistors have electrical characteristics that are closer to one other as compared to the access transistors being located near the periphery of the die. The design of other parts of the die may not allow the controller and access transistors to be near the center. Skilled artisans will be able to determine where the controller and access transistors will be located.

Figure 8:
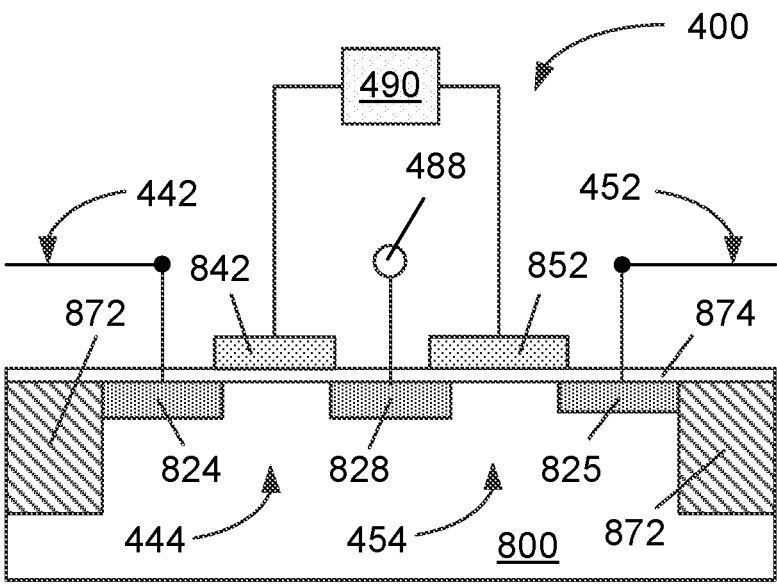
FIG. 8 includes an illustration of a cross-sectional view of a portion of the die of FIG. 4 that includes a pair of access transistors.

To reduce the size of access transistors, a pair of access transistors may share a common current-carrying region. FIG. 8 includes a cross-sectional view of a portion of the die 400 that includes the access transistors 444 and 454 that are electrically coupled to the terminal 488. A substrate 800 can be a relatively lightly doped semiconductor material, and doped regions 824, 825, and 828 can be relatively heavily doped and of the opposite conductivity type as compared to the substrate 800. In a particular implementation, the substrate 800 can be p-type doped with a dopant concentration in a range from $1 \times 10^{14}$ atoms/cm$^3$ to $1 \times 10^{17}$ atoms/cm$^3$. The doped regions 824, 825, and 828 can be n-type doped with a dopant concentration in a range from $5 \times 10^{18}$ atoms/cm$^3$ to $1 \times 10^{21}$ atoms/cm$^3$. Each of the doped regions 824, 825, and 828 can be a drain, a source, or a drain/source region for the access transistors 444 and 454 depending on the biasing conditions of the terminals. The doped region 828 is shared by both access transistors 444 and 454 and helps to keep the area occupied by the access transistors 444 and 454 relatively smaller as compared to separate doped regions for the access transistors 444 and 454 in place of the doped region 828.

Field isolation regions 872 are adjacent to the doped regions 824 and 825 and extend into the substrate 800. In a particular implementation, the field isolation region 872 can be shallow trench isolation. A gate dielectric layer overlies at least portions of the doped regions 824, 825, and 828 and the portions of the substrate 800 between such doped regions. In the implementation, the gate dielectric layer 874 overlies all of the portion of the die 400 illustrated in FIG. 8. A gate electrode 842 overlaps a portion of the substrate 800 between the doped regions 824 and 828 and portions of the doped regions 824 and 828. A gate electrode 852 overlaps a portion of the substrate 800 between the doped regions 825 and 828 and portions of the doped regions 825 and 828.

For the access transistor 444, an electrical connection can be made between the doped region 824 and the sensor 442, and an electrical connection can be made between the doped region 828 and the terminal 488. For the access transistor 454, an electrical connection can be made between the doped region 825 and the sensor 452. Electrical couplings can be made between the gate electrodes 842 and 852 and the controller 490. Similar structures can be used for the other access transistors of the die 400. The other dies 100, 300, and 600 may also use the same design considerations as the die 400 as illustrated in FIG. 8.

Figure 9:
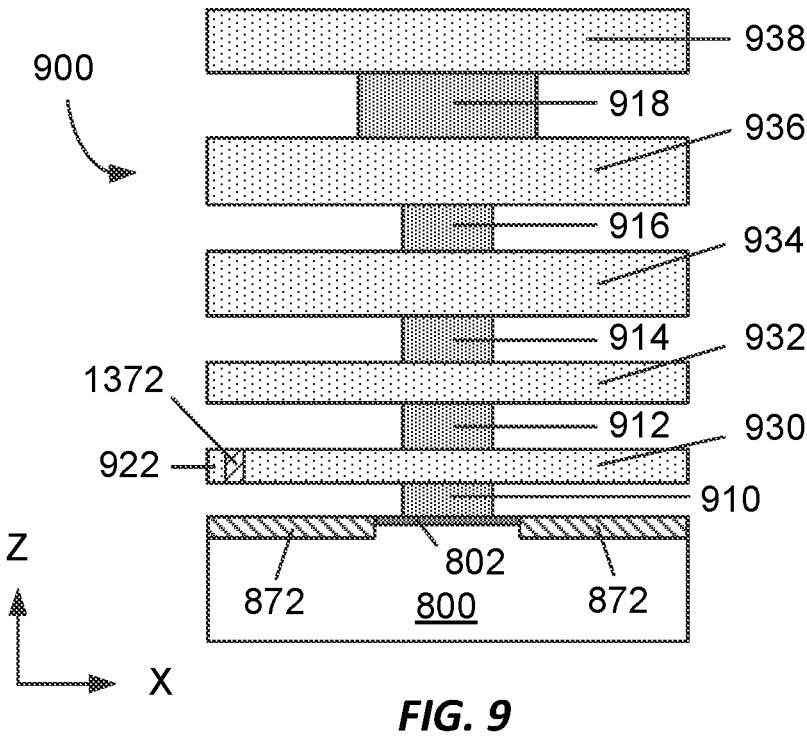
FIG. 9 includes an illustration of a cross-sectional view of a portion of the die that includes an edge guard ring, a sensor, and a substrate.

The previously described designs can have the sensors spaced apart from and not overlapped or underlapped by a portion of the edge guard ring. In another implementation, at least part of a sensor can be overlapped or underlapped by part of the edge guard ring. FIG. 9 includes an illustration of a die including an edge guard ring 900 and a sensor 922. The edge guard ring 900 includes conductive vias 910, 912, 914, 916, and 918 and interconnects 930, 932, 934, 936, and 938 at different interconnect levels. The sensor 922 is at the same interconnect level as the interconnect 930.

The conductive via 910 contacts a body contact region 802, which is a doped region within the substrate 800. The body contact region 802 has a dopant concentration sufficient to form an ohmic contact between the body contact region 802 and the conductive via 910. Although not illustrated in FIG. 9, interlevel dielectric (ILD) layers are adjacent to the conductive vias 910, 912, 914, 916, and 918 and interconnects 930, 932, 934, 936, and 938. A portion of an ILD layer 1372 electrically isolates the sensor 922 from the interconnect 930. Thus, the sensor 922 can be at a different voltage as compared to the edge guard ring 900 when the sensor 922 is being tested.

Figure 10:
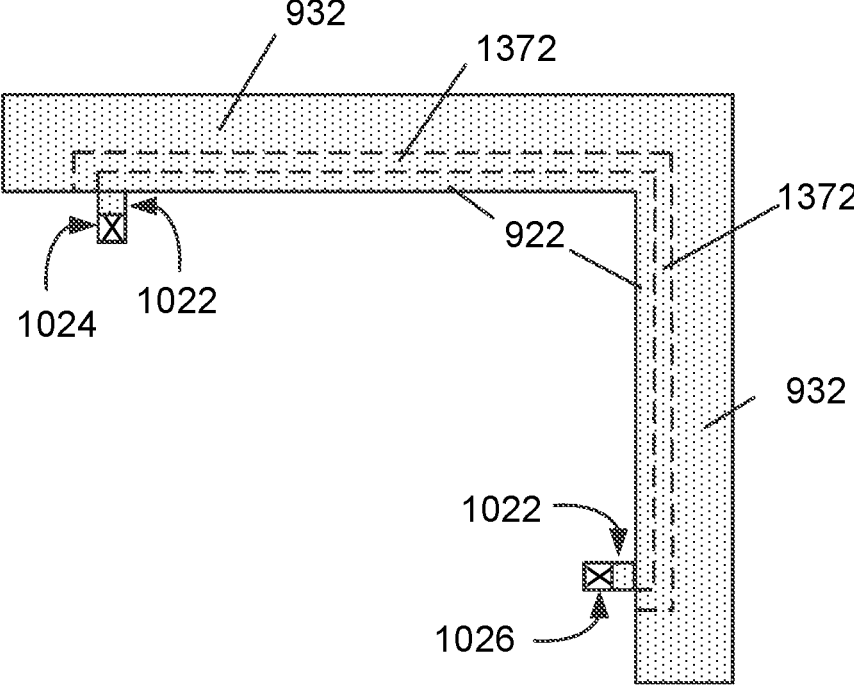
FIG. 10 includes an illustration of a cross-sectional view of portions of an interconnect, tabs extending from a sensor, and electrical contact locations for the sensor.

FIG. 10 includes a top view of portions of the interconnect 932 to illustrate how the interconnect 932 overlaps the sensor 922. Dashed lines are used with respect to the sensor 922 and the portion of the ILD layer 1372 because the sensor 922 and the portion of the ILD layer 1372 are not seen from a top view. The sensor 922 is located between the inner edge of the interconnect 932 and the dashed line closer to the inner edge of the interconnect 932. The portion of the ILD layer 1372 is located between the dashed lines in FIG. 10. FIG. 10 includes only a portion of the edge guard ring 900, including the interconnect 932, and the edge guard ring 900 extends beyond what is illustrated in FIG. 10.

The sensor 922 can be an L-shaped sensor. Tabs 1022 are portions of the sensor 922 that extend beyond the interconnect 932 to allow electrical connections 1024 and 1026 (illustrated by the boxed "Xs") to access transistors (not illustrated). The sensor section of the sensor 922 is the portion of the between the electrical connections 1024 and 1026 and has a sensor length. Along at least 80% of the length of the sensor section of the sensor 922 underlaps the interconnect 932. As illustrated, other than the tabs 1022, all of the sensor section underlies the interconnect 932. The portion of the ILD layer 1372 is between the dashed lines and underlaps the interconnect 932. The interconnect 930 (not labelled in FIG. 10) is above and to the right of the dashed line that is closer to the top and right-hand side of the die as illustrated in FIG. 10. The interconnect 930 underlaps the interconnect 932.

Referring to FIG. 9, the widths of the interconnects 932, 934, 936, and 938 can be substantially the same. The upper and right-hand edges of the interconnect 932 can be coterminous with the upper and right-hand edges of the interconnect 930. The lower and left-hand edges of the interconnect 932 can be coterminous with the lower and left-hand edges of the sensor 922. Thus, the combined widths of the sensor 922, the portion of the ILD layer 1372, and the interconnect 930 can be the same as the width of the interconnect 932 +/−0.1 micron.

The thicknesses of the interconnects can be different at different levels of interconnects. The interconnects 930 and 932 may be thinner than the interconnects 934, 936, and 938. The thinner interconnects may allow for smaller design rules. Referring to FIG. 9, the design rules for the interconnect level that includes the interconnect 930 may allow the sensor 922 and the portion of the ILD layer 1372 to have widths of 0.1 micron. The sensor 922, the portion of the ILD layer 1372, or both may be wider if needed or desired.

Figure 11:
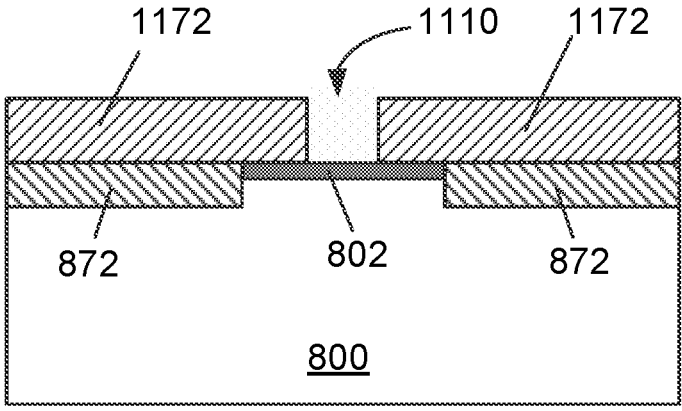
FIG. 11 includes an illustration of a cross-sectional view of a portion of a die after forming an interlevel dielectric layer and a contact opening.

FIGS. 11 to 14 illustrate a process for forming the conductive via 910, the interconnect 930 and the sensor 922. The process is exemplary and is used to illustrate and not limit how the features can be formed. An ILD layer 1172 can be formed over the substrate 800, body contact region 802, and the field isolation regions 872 as illustrated in FIG. 11. The ILD layer 1172 can include a single film or a plurality of films, wherein the single film or any film within the plurality of films includes an oxide, a nitride, or an oxynitride. The ILD layer 1172 can be patterned to define contact openings and a via trench 1110 that exposes the body contact region 802. The contact openings to circuits and other structures of the die are not illustrated in FIG. 11. From a top view, the via trench 1110 has a shape that corresponds to the edge guard ring.

Figure 12:
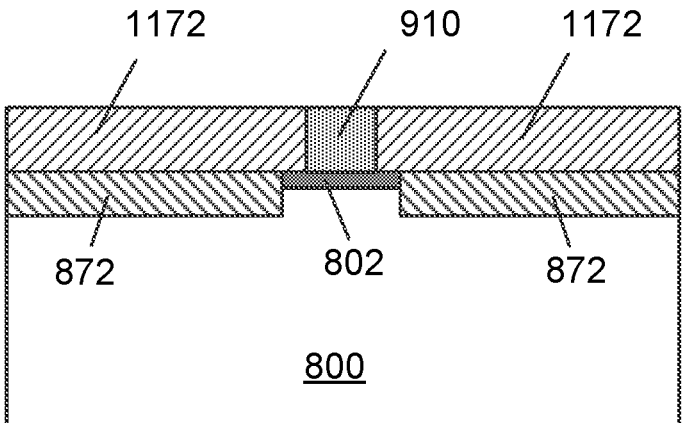
FIG. 12 includes an illustration of a cross-sectional view of the die of FIG. 11 after forming a conductive via within the contact opening.

Referring to FIGS. 11 and 12, a conductive layer can be formed over the ILD layer 1172 and within the contact openings and via trench 1110. Portions of the conductive layer outside the contact openings and the via trench 1110 can be removed to form conductive vias, including the conductive via 910. The conductive layer can include a single film or a plurality of films. The conductive layer can include W, Ti, TiN, Ta, TaN, WN, Ti—W, or the like. A polishing technique (for example, chemical-mechanical polishing) or a resist-etch-back process can be used to remove the portions of the conductive layer that are outside the contact openings and the via trench 1110.

Figure 13:
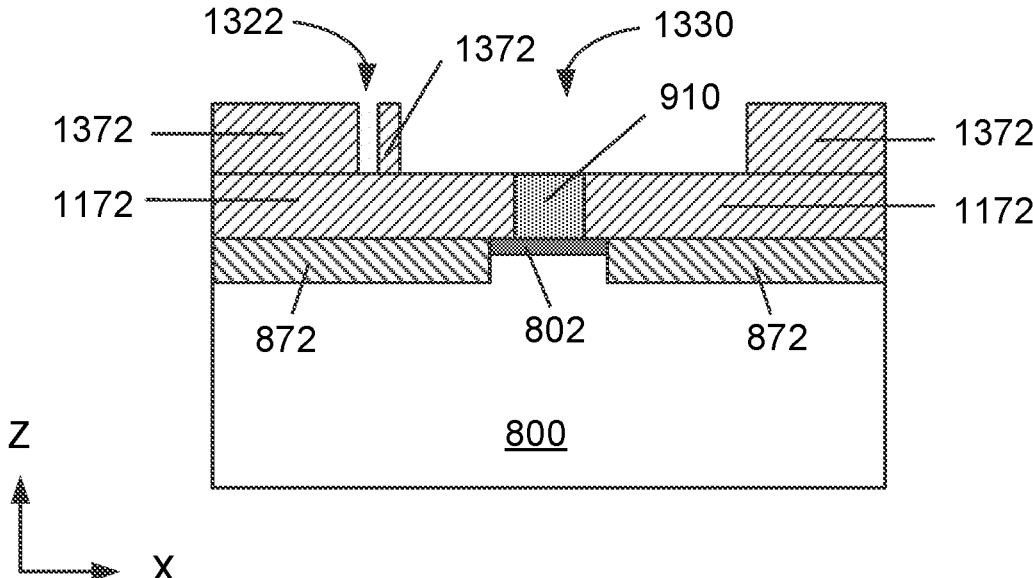
FIG. 13 includes an illustration of a cross-sectional view of the die of FIG. 12 after forming another interlevel dielectric layer and interconnect trenches.

Referring to FIG. 13, the ILD layer 1372 can be formed over the ILD layer 1172 and the conductive vias, including the conductive via 910. The ILD layer 1372 can have any of the number of films and compositions as previously described with respect to the ILD layer 1172. The ILD layer 1372 can be patterned to define sensor trenches, including the sensor trench 1322, and interconnect trenches, including the interconnect trench 1330. From a top view, the sensor trenches correspond to the shapes of the sensors and include parts for the sensor tabs, such as the sensor tabs 1022 in FIG. 10. The interconnect trenches for the circuits and other structures of the die are not illustrated in FIG. 13. From a top view, the interconnect trench 1330 has a shape that corresponds to the edge guard ring. A portion of the ILD layer 1372 electrically isolates the subsequently-formed sensors within the sensor trenches from the subsequently-formed interconnect within the interconnect trench 1330.

As measured in the X-direction in FIG. 13, the width of the sensor trenches, including the sensor trench 1322, and the portions of the ILD layer 1372 between the sensor trenches and the interconnect trench 1330 can range from the smallest design rule at the particular interconnect level (which may depend on the lithography equipment used in patterning the ILD layer 1372) to 0.2 micron. A larger width may be used; however, the sensors and portions of the ILD layer 1372 will occupy more area. In a particular implementation, the widths of the sensor trenches and the portions of the ILD layer 1372 between the sensor trenches and the interconnect trench 1330 may be approximately 0.1 micron. In another implementation, the widths of the sensor trenches can be different from the widths of the portions of the ILD layer 1372 between the sensor trenches and the interconnect trench 1330.

Figure 14:
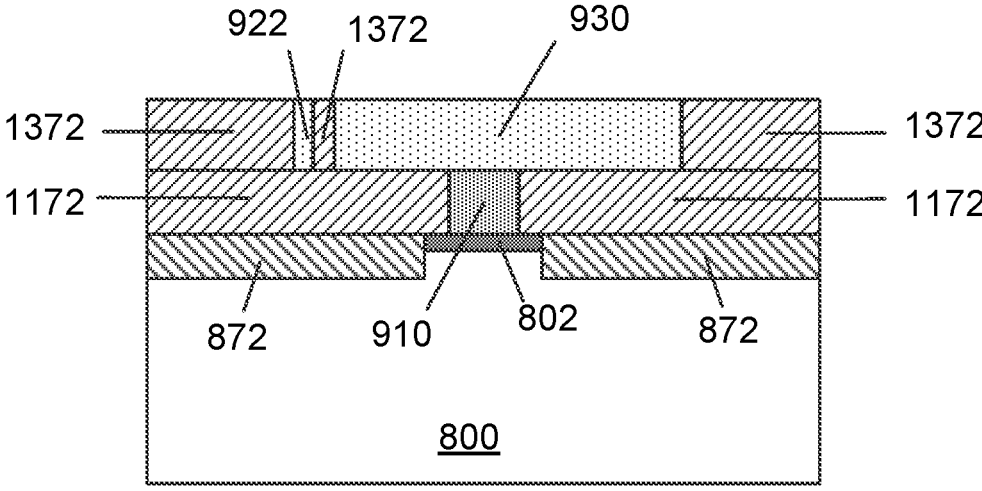
FIG. 14 includes an illustration of a cross-sectional view of the die of FIG. 13 after forming interconnects within the interconnect trenches.

Referring to FIGS. 13 and 14, a conductive layer can be formed over the ILD layer 1372 and within the sensor trenches, including the sensor trench 1322, and the interconnect trenches, including the interconnect trench 1330. Portions of the conductive layer outside the sensor trenches and the interconnect trenches can be removed to form sensors, including the sensor 922, and interconnects, including the interconnect 930. The conductive layer can include a single film or a plurality of films. The conductive layer can include any of the materials as previously described with respect to the conductive layer for the conductive vias, including the conductive via 910. Further, the conductive layer can include Cu, Al-1% Cu, Ni, or the like. In a particular implementation, the conductive layer can include an adhesion film, a barrier film, and a bulk film that is at least 50 wt % of the material within the interconnect 930. The barrier film can be a refractory metal nitride (TiN, TaN, WN) or another material so that material within the bulk film (Cu, Al-1% Cu, Ni, or the like) does not enter the ILD layers 1172 and 1372, and the adhesion film can be a refractory metal (Ti, Ta, or the like), or an alloy thereof. In another implementation, the adhesion and barrier films can be replaced by a single film, or neither the adhesion film nor the barrier film is used. A polishing technique (for example, chemical-mechanical polishing) or a resist-etch-back process can be used to remove the portions of the conductive layer that are outside the sensor trenches and interconnect trenches. The sensors, including the sensor 922, and interconnects, including the interconnect 930, are formed.

Referring to FIG. 9, the process previously described for the conductive via 910 and the interconnect 930 can be used to form the conductive vias 912, 914, 916, and 918 and the interconnects 932, 934, 936, and 938. Sensors are not formed with the interconnects 932, 934, 936, and 938. Thus, sensor trenches are not formed in the ILD layers where the interconnects 932, 934, 936, and 938 reside.

As measured in the X-direction, the widths of the interconnects 932, 934, 936, and 938 are wider than the interconnect 930. In a particular implementation, the widths of the interconnects 932, 934, 936, and 938 can be approximately the same as the combined widths of the sensor 922 (in FIG. 9), the interconnect 930, and the portion of the ILD layer 1372 between the sensor 922 and the interconnect 930. In another implementation, the sensor 922 may be wider, and any one or more of the interconnects 932, 934, 936, and 938 may only partly, and not completely, overlap the sensor 922 as illustrated in FIG. 9. Any one or more of the interconnects 932, 934, 936, and 938 may overlap the sensor 922 along at least 80% of the length (along the conduction path) of the sensor 922. In a particular implementation, the interconnects 932, 934, 936, and 938 may overlap the sensor 922 along at least 80% of the length (along the conduction path) of the sensor section (between the electrical connections 1024 and 1026 in FIG. 10) of the sensor 922.

Figure 15:
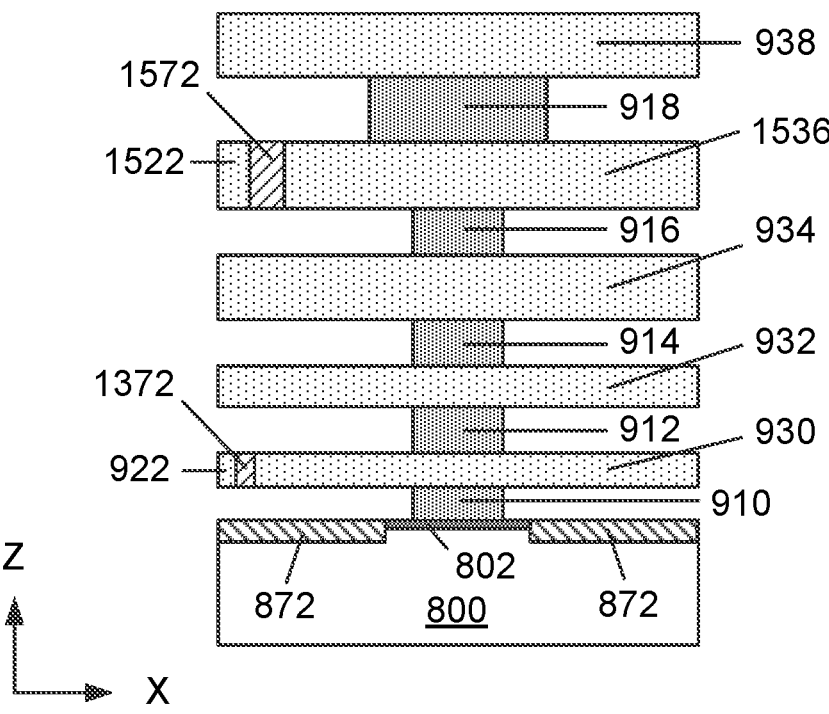
FIG. 15 includes an illustration of a cross-sectional view of a portion of a die that includes an edge guard ring, sensors, and a substrate in accordance with another implementation.

Sensors at more than one interconnect may be used, or the sensor may be at a different interconnect level than is illustrated in FIG. 9. The edge guard ring and sensors in FIG. 15 are similar to the edge guard ring and sensor in FIG. 9, except that the interconnect 936 in FIG. 9 is replaced by a sensor 1522, an interconnect 1536, and a portion of an ILD layer 1572. The process of forming the sensor 1522, the interconnect 1536, and the portion of an ILD layer 1572 may use any of the techniques previously described with respect to the sensor 922, the interconnect 930, and the portion of the ILD layer 1372.

As compared to the interconnect 930, the interconnect 1536 is thicker (in the Z-direction) and the interconnect level that includes the interconnect 1536 has larger design rules as compared to the interconnect level that includes the interconnect 930. At the interconnect level with the interconnect 1536, the widths of the sensors, including the sensor 1522, are greater than the widths of the sensors at the interconnect level with the interconnect 930, and the widths of the portions of the ILD layer 1572 between the sensors and the interconnect 1536 are greater than the widths of ILD layer 1372 between the sensors and the interconnect 930.

As measured in the X-direction in FIG. 15, the width of the sensor, including the sensor 1522, and the portions of the ILD layer 1572 between the sensors and the interconnect 1536 can range from the smallest design rule at the interconnect level to 0.5 micron. A larger width may be used; however, the sensors and portions of the ILD layer 1572 will occupy more area. In a particular implementation, the widths of the sensor trenches and the portions of the ILD layer 1572 between the sensor trenches and the interconnect trench 1330 may be approximately 0.2 micron. In another implementation, the widths of the sensors, including the sensor 1522, can be different from the widths of the portions of the ILD layer 1572 between the sensors and the interconnect 936.

In another implementation, the widths of the interconnects 932, 934, and 938 may be substantially the same as the combined widths of the sensor 1522, the interconnect 1536, and the portion of the ILD layer 1572 between the sensor 1522 and the interconnect 1536.

At the interconnect level with the interconnect 1536, the interconnect 934 underlaps at least part of the sensors, including the sensor 1522, and the interconnect 938 overlaps at least part of the sensors, including the sensor 1522. The overlap and underlap relationships between interconnects 934 and 938 and the sensors at the interconnect level with the interconnect 1536 may be any of the overlap relationships between interconnect 932 and the sensors at the interconnect level with the interconnect 930. For example, the sensors, including the sensor 1522, may be wider than illustrated in FIG. 15. The interconnect 934 may partly, and not completely, underlap, the sensors, including the sensor 1522. In the same or different implementation, the interconnect 938 may partly, and not completely, overlap the sensors, including the sensor 1522.

Referring to FIG. 15, the sensor 922 and portion of the ILD layer 1372 can be removed because the sensors, including the sensor 1522, are present. The interconnect 930 can remain as illustrated or may be wider, such that its width is substantially the same as the interconnect 932.

Figure 16:
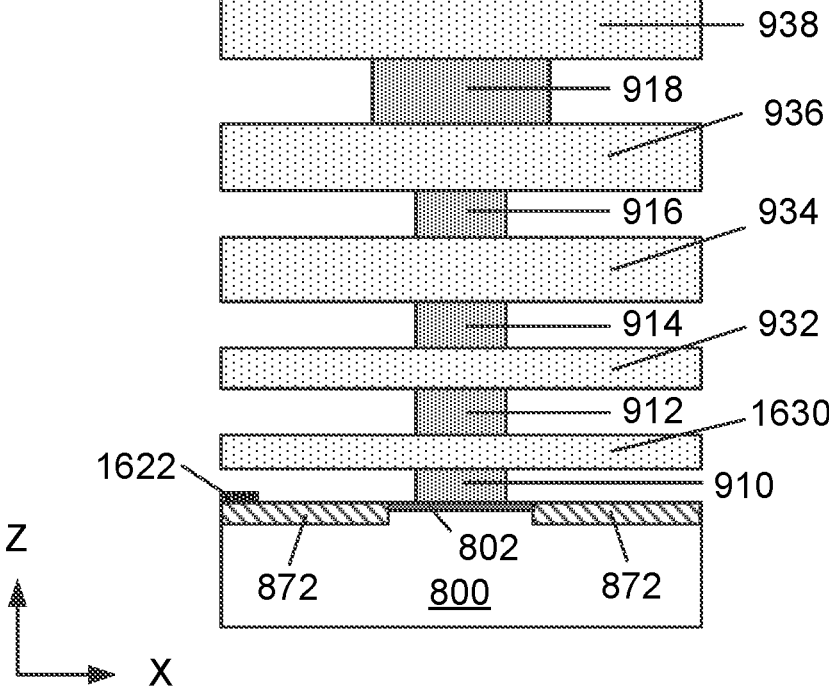
FIG. 16 includes an illustration of a cross-sectional view of a portion of a die that includes an edge guard ring, a sensor, and a substrate in accordance with another implementation.

The sensors may be formed at an elevation that is different from the interconnect levels. FIG. 16 includes an alternative implementation, in which a layer of resistive or conductive material is patterned to form sensors, including the sensor 1622. In an implementation, the sensors, including the sensor 1622, can include doped polycrystalline silicon (polySi) and may or may not be covered by a silicide layer. From a top view, the shape and the dimensions of the sensors, including the sensor 1622 can be any of the shape and dimensions the previously described sensors. In the implementation as illustrated in FIG. 16, the sensors, including the sensor 1622, can extend farther under the overlapping interconnects 1630, 932, 934, 936, and 938. If needed or desired, one or more of the sensors may underlap only a portion of the interconnects 1630, 932, 934, 936, and 938 or one or more of the sensors do not underlap any of the interconnects 1630, 932, 934, 936, and 938.

The interconnect 1630 may be substantially the same as the interconnect 930 except that the width of the interconnect 1630 may be substantially the same as or at least closer to the width of any of the interconnects 932, 934, 936, and 938. In another implementation, the interconnect 1630 can be replaced by the interconnect 930.

Figure 17:
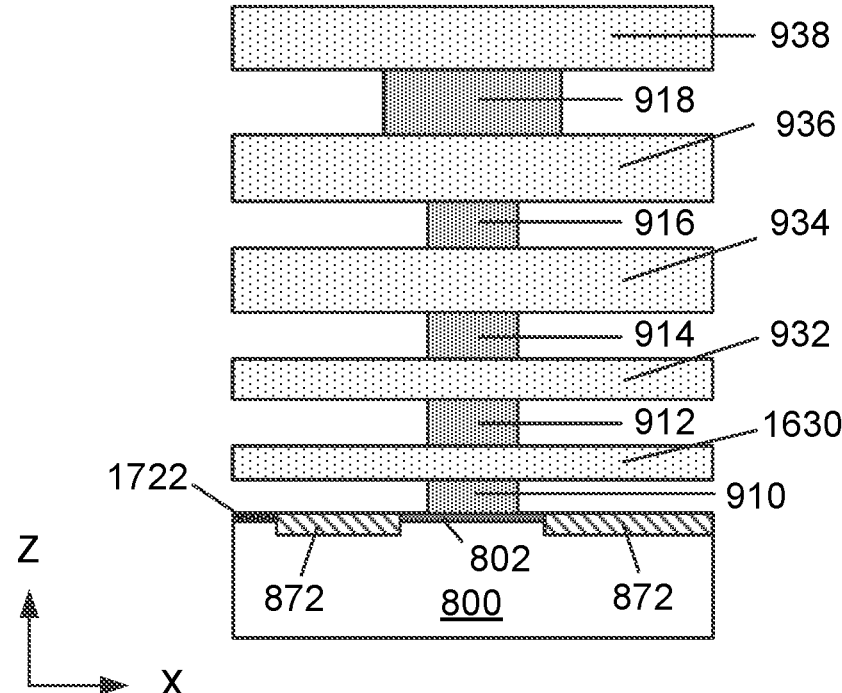
FIG. 17 includes an illustration of a cross-sectional view of a portion of a die that includes an edge guard ring, a sensor, and a substrate in accordance with another implementation.

FIG. 17 includes an alternative implementation, in which doped regions within the substrate 800 are sensors, including the sensor 1722. In an implementation, the doped regions can have a conductivity type opposite the conductivity type of the substrate 800. In another implementation, the doped regions can have the same conductivity type as the substrate 800, and the doped regions can be within well regions of the opposite conductivity type to electrically isolate the doped regions from the substrate 800. In the either of the foregoing implementations or a different implementation, the sensors, including the sensor 1722, may or may not be covered by a silicide layer.

From a top view, the shape and the dimensions of the sensors, including the sensor 1722, can be any of the shape and dimensions the previously described sensors. In the implementation as illustrated in FIG. 17, the sensors, including the sensor 1722, can extend farther under the overlapping interconnects 1630, 932, 934, 936, and 938. If needed or desired, one or more of the sensors may underlap only a portion of the interconnects 1630, 932, 934, 936, and 938 or one or more of the sensors do not underlap any of the interconnects 1630, 932, 934, 936, and 938.

Many designs and implementations are described above. Some of the options are briefly summarized below.

One or more interconnects of an edge guard ring may or may not overlap or underlap sensors. For example, the sensors in FIGS. 1 to 7 are illustrated as not being overlapped or underlapped by the edge guard ring. The sensors in FIGS. 1 to 7 can be changed such that at least one of the sensors is at least partly overlapped, underlapped, or both by interconnects within the edge guard ring. Alternatively, the sensors in FIGS. 9 to 17 can be moved such that the sensors are not overlapped or underlapped by any of the interconnects within the edge guard ring.

The sensors can be formed at one or more elevations of the die. The sensor can be at the same interconnect level as an interconnect for the edge guard ring. The sensor can be a thin-film resistor over the substrate and below a lowest interconnect level. The sensor can be a doped region formed from a portion of the substrate. Sensors can be located at more than one elevation. For example, a sensor can be at an interconnect level at an elevation closest to the substrate, and another sensor can be at an interconnect level farther from the substrate. The sensor at the lower elevation may be relatively more sensitive to cracks that originate from a force on the substrate, and the sensor at the higher elevation may be relatively more sensitive to cracks that originate from a force on top of the die.

For a die, all of the sensors can be substantially identical to each other. In other implementations, at least one or all of the sensors can be different from each other. For example, an electrical parameter for a sensor can be compared to the expected value for the electrical parameter based on the design of the sensor. Alternatively, a compensation factor can be used when comparing an electrical parameter for a particular sensor to an electrical parameter for another sensor having a different design as previously described with respect to the sensors in FIG. 6.

A user can select a test methodology that works best or is preferred by the user. For example, a current from a current source can be injected into a sensor, and a voltage drop between the terminals can be measured. The voltage drop can be used for the electrical analysis or a resistance can be obtained from the voltage drop and current. Alternatively, a sensor can be electrically coupled to its corresponding terminals that are at different voltages, and the current flowing through the sensor can be measured. The current can be used for the electrical analysis or a resistance can be obtained from the voltage difference between the terminals divided by the measured current. Thus, the user can determine whether to use a measured voltage drop, a measured current, or a corresponding resistance for the analysis of the electrical parameter. Analysis can be performed using an analog value, or the analog measurement can be converted to a digital value that is used for the analysis.

The testing methodology and analysis of the electrical parameters obtained from any of the sensors can be performed on the same die as the sensors as part of a built-in self test. Alternatively, the controller for the access transistors, the analysis of the electrical parameters, or both can be located within or performed external to the die.

Many of the components have been described with respect to electrical couplings. In an alternative implementation, any or all of the electrical couplings can be electrical connections. For example, any or all of the sensors can be electrically connected to the corresponding access transistor(s), any or all of the access transistors can be electrically connected to the corresponding terminal(s), and any or all of the gate electrodes of the access transistors can be electrically connected to the controller.

After reading the specification, skilled artisans realize they have many options from which to choose. A user can determine the number, the design, and location of the sensors, and how and where to perform a test methodology and analysis of electrical parameters to meet the needs or desires for a particular application.

The implementations described herein provide many benefits. The methods of testing the sensors and analyzing electrical parameters obtained from the sensors can be performed at nearly any time. The testing and analysis can be performed after die fabrication and before packaging, after packaging and before attaching the packaged die to another die or a printed wiring or circuit board, after die attachment and before installation into an electrical system, or after installation into the electrical system. The testing and analysis can be performed without removing the die from the system, from a printed wiring or circuit board, or the other die. The testing can be performed quickly, for example, less than 10 µs per sensor.

At least two sensors within a die can allow for a more precise location of where a crack in a die exists. The design of the sensors may allow for testing at least two sensors at the same time to further reduce the time needed for testing all sensors on the die. The sensors can be located where they are at least partly overlapped or underlapped by interconnects within the edge guard ring to conserve area of the die. Further, many design, testing, and analysis options are available so that the number, design, and locations of the sensors and their use can be tailored for a particular application.

Implementation 1. An electronic device can include a first sensor adjacent to a first portion of a peripheral edge of a die; a first access transistor electrically coupled to the first sensor; a second sensor adjacent to a second portion of the peripheral edge of the die; and a second access transistor electrically coupled to the second sensor. The first sensor and the second sensor can be different sensors, and the first portion and the second portion can be different portions of the peripheral edge of the die. The electronic device is adapted such that when the first access transistor is on and the second access transistor is off, current flows through the first sensor and no current flows through the second sensor, and when the second access transistor is on and the first access transistor is off, current flows through the second sensor and no current flows through the first sensor.

Implementation 2. The electronic device of Implementation 1 further includes a third access transistor electrically coupled to the first sensor and a fourth access transistor electrically coupled to the second sensor.

Implementation 3. The electronic device of Implementation 1 further includes a third sensor adjacent to a third portion of the peripheral edge of the die; a third access transistor electrically coupled to the third sensor; a fourth sensor adjacent to a fourth portion of the peripheral edge of the die; and a fourth access transistor electrically coupled to the fourth sensor. The first portion of the peripheral edge of the die includes a first corner of the die, the second portion of the peripheral edge of the die includes a second corner of the die, the third portion of the peripheral edge of the die includes a third corner of the die, and the fourth portion of the peripheral edge of the die includes a fourth corner of the die, and the first corner, the second corner, the third corner, and the fourth corner are different corners of the die.

Implementation 4. The electronic device of Implementation 3, wherein, from a top view, each of the first sensor, the second sensor, the third sensor, and the fourth sensor is an L-shaped sensor.

Implementation 5. The electronic device of Implementation 1, wherein each of the first sensor and the second sensor is a U-shaped sensor.

Implementation 6. The electronic device of Implementation 1 further includes a controller adapted to provide a voltage to a gate electrode of the first access transistor or the second access transistor to turn on or turn off the first access transistor or the second access transistor.

Implementation 7. The electronic device of Implementation 1 further includes an electronic comparator electrically coupled to the first access transistor and the second access transistor.

Implementation 8. The electronic device of Implementation 1, wherein the first sensor has a first length extending from a first end of the first sensor to a second end of the first sensor, the second sensor has a second length extending from a first end of the second sensor to a second end of the second sensor, and the second length is within 5% of the first length.

Implementation 9. The electronic device of Implementation 1, wherein the first sensor has a first sheet resistance, the second sensor has a second sheet resistance, and the first sheet resistance is within 5% of the second sheet resistance.

Implementation 10. The electronic device of Implementation 1 further includes an edge guard ring between the peripheral edge of the die and each of the first sensor and the second sensor, wherein the die has a width dimension and a length dimension that is equal to or greater than the width dimension, and each of the first sensor and the second sensor is a distance from the peripheral edge, wherein the distance is at most 9% of the width dimension of the die.

Implementation 11. The electronic device of Implementation 1 further includes an edge guard ring that includes an interconnect and is between the peripheral edge of the die and each of the first sensor and the second sensor, wherein the first sensor, the second sensor, and the interconnect of the edge guard ring are at a same interconnect level.

Implementation 12. An electronic device can include an edge guard ring including a first interconnect and a first sensor electrically insulated from the edge guard ring. The first sensor can include a first terminal tab, a second terminal tab, and a sensor section extending from the first terminal tab to the second terminal tab, and at least a portion of the sensor section can overlap or underlap a portion of the first interconnect.

Implementation 13. The electronic device of Implementation 12, wherein the edge guard ring further includes a second interconnect, and the second interconnect and the sensor section lie at a same interconnect level.

Implementation 14. The electronic device of Implementation 13, wherein the sensor section has a sensor length, and along at least 80% of the sensor length, the at least a portion of the sensor section underlaps or overlaps the first interconnect.

Implementation 15. A method can include obtaining a first electrical parameter associated with a first sensor while a first access transistor is on and a second access transistor is off. The first sensor can be adjacent to a first portion of a peripheral edge of a die, the first access transistor can be electrically coupled to the first sensor and may not be electrically connected to a second sensor. The second sensor can be adjacent to a second portion of the peripheral edge of the die, the second access transistor can be electrically coupled to the second sensor and may not be electrically connected to the first sensor. The method can further include obtaining a second electrical parameter associated with the second sensor while the second access transistor is on and the first access transistor is off; and determining whether or not a first crack in the die is adjacent to or extends through the first sensor or whether or not a second crack in the die is adjacent to or extends though the second sensor.

Implementation 16. The method of Implementation 15 further includes placing a first voltage difference across the first sensor, wherein obtaining the first electrical parameter includes measuring a first current associated with the first sensor; and placing a second voltage difference across the second sensor, wherein obtaining the second electrical parameter includes measuring a second current associated with the second sensor, wherein determining is performed using the first current and the second current.

Implementation 17. The method of Implementation 15 further includes injecting a first current into the first sensor, wherein obtaining the first electrical parameter includes measuring a first voltage drop associated with the first sensor; and injecting a second current into the second sensor, wherein obtaining the second electrical parameter includes measuring a second voltage drop associated with the second sensor, wherein determining is performed using the first voltage drop and the second voltage drop.

Implementation 18. The method of Implementation 15 further includes obtaining a third electrical parameter associated with a third sensor while a third access transistor is on. The third sensor is adjacent to a third portion of the peripheral edge of the die, the third access transistor is electrically coupled to the third sensor and is not electrically connected to a fourth sensor, the fourth sensor is adjacent to a fourth portion of the peripheral edge of the die, and a fourth access transistor is electrically coupled to the fourth sensor and is not electrically connected to the third sensor. The method can further include obtaining a fourth electrical parameter associated with the fourth sensor while the fourth access transistor is on; and determining whether or not a third crack in the die is adjacent to or extends through the third sensor or whether or not a fourth crack in the die is adjacent to or extends through the fourth sensor.

Implementation 19. The method of Implementation 18, wherein the first portion of the peripheral edge is adjacent to a first corner of the die, the second portion of the peripheral edge is adjacent to a second corner of the die, the third portion of the peripheral edge is adjacent to a third corner of the die, the fourth portion of the peripheral edge is adjacent to a fourth corner of the die, and the first corner is opposite the fourth corner, the second corner is opposite the third corner.

Implementation 20. The method of Implementation 19, wherein obtaining the first electrical parameter is performed while the second access transistor and the third access transistor are off, obtaining the second electrical parameter is performed while the first access transistor and the fourth access transistor are off, obtaining the third electrical parameter is performed while the first access transistor and the fourth access transistor are off, and obtaining the fourth electrical parameter is performed while the second access transistor and the third access transistor are off.

Implementation 21. The method of Implementation 18, wherein any two or more of the first crack, the second crack, the third crack, and the fourth crack are different parts of a same crack.

Implementation 22. The method of Implementation 15, wherein determining whether the first crack in the die is adjacent to or extends through the first sensor or the second crack in the die is adjacent to or extends through the second sensor includes comparing the first electrical parameter and the second electrical parameter to each other.

Implementation 23. The method of Implementation 15, wherein determining whether the first crack in the die is adjacent to or extends through the first sensor or the second crack in the die is adjacent to or extends through the second sensor includes comparing the first electrical parameter to a first reference value corresponding to the first sensor, and comparing the second electrical parameter to a second reference value corresponding to the second sensor.

Implementation 24. The method of Implementation 15, wherein the method is performed before packaging the die, before attaching the die or a packaged die including the die to an other die or a printed wiring board or a circuit board, after attaching the die or the packaged die to the other die or the printed wiring board or the circuit board and before installing other die or the printed wiring board or the circuit board into a first electrical system, or on the die, where a second electrical system that includes (1) the die or the packaged die attached to (2) the other die or the printed wiring board or the circuit board.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims.

The specification and illustrations of the implementations described herein are intended to provide a general understanding of the structure of the various implementations. The specification and illustrations are not intended to serve as an exhaustive and comprehensive description of all of the elements and features of apparatus and systems that use the structures or methods described herein. Separate implementations may also be provided in combination in a single implementation, and conversely, various features that are, for brevity, described in the context of a single implementation, may also be provided separately or in any subcombination. Further, reference to values stated in ranges includes each and every value within that range. Many other implementations may be apparent to skilled artisans only after reading this specification. Other implementations may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An electronic device, comprising:
a first sensor adjacent to a first portion of a peripheral edge of a die;
a first sensor access transistor electrically coupled to the first sensor;
a second sensor adjacent to a second portion of the peripheral edge of the die; and
a second sensor access transistor electrically coupled to the second sensor,
wherein:
the first sensor and the second sensor are different sensors, and the first portion and the second portion are different portions of the peripheral edge of the die, and
the electronic device is adapted such that:
when the first sensor access transistor is on and all other sensor access transistors not coupled to the first sensor are off, current can flow through the first sensor and no current flows through any other sensor in the die, and
when the second sensor access transistor is on and all other sensor access transistors not coupled to the second sensor are off, current can flow through the second sensor and no current flows through any other sensor in the die.

2. The electronic device of claim 1, wherein the first sensor and the second sensor are substantially identical to each other.

3. The electronic device of claim 1, further comprising:
a third sensor adjacent to a third portion of the peripheral edge of the die;
a third sensor access transistor electrically coupled to the third sensor;
a fourth sensor adjacent to a fourth portion of the peripheral edge of the die; and
a fourth sensor access transistor electrically coupled to the fourth sensor,
wherein:
the first portion of the peripheral edge of the die includes a first corner of the die,
the second portion of the peripheral edge of the die includes a second corner of the die,
the third portion of the peripheral edge of the die includes a third corner of the die, and
the fourth portion of the peripheral edge of the die includes a fourth corner of the die, and
the first corner, the second corner, the third corner, and the fourth corner are different corners of the die.

4. The electronic device of claim 2, wherein, from a top view, each of the first sensor, the second sensor, a third sensor, and a fourth sensor is an L-shaped sensor.

5. The electronic device of claim 2, wherein, from a top view, each of the first sensor and the second sensor is a U-shaped sensor.

6. The electronic device of claim 1, further comprising:
a controller adapted to provide a voltage to a gate electrode of the first sensor access transistor or the second sensor access transistor to turn on or turn off the first sensor access transistor or the second sensor access transistor.

7. The electronic device of claim 1, further comprising:
an electronic comparator electrically coupled to the first sensor access transistor and the second sensor access transistor.

8. The electronic device of claim 2, wherein:
the first sensor has a first length extending from a first end of the first sensor to a second end of the first sensor,
the second sensor has a second length extending from a first end of the second sensor to a second end of the second sensor, and
the second length is within 5% of the first length.

9. The electronic device of claim 2, wherein:
the first sensor has a first sheet resistance,
the second sensor has a second sheet resistance, and
the first sheet resistance is within 5% of the second sheet resistance.

10. The electronic device of claim 1, further comprising:
an edge guard ring between the peripheral edge of the die and each of the first sensor and the second sensor,
wherein:
the die has a width dimension and a length dimension that is equal to or greater than the width dimension, and
all of a length of each of the first sensor and the second sensor is a distance from the peripheral edge, wherein the distance is at most 9% of the width dimension of the die.

11. The electronic device of claim 1, further comprising:
an edge guard ring that includes an interconnect and is between the peripheral edge of the die and each of the first sensor and the second sensor,
wherein the first sensor, the second sensor, and the interconnect of the edge guard ring are at a same interconnect level.

12. A method, comprising:
obtaining a first electrical parameter associated with a first sensor, wherein:
a die includes the first sensor, a second sensor, and sensor access transistors, including a first pair of sensor access transistors, and a second pair of sensor access transistors,
the first sensor is adjacent to a first portion of a peripheral edge of the die,
the first pair of sensor access transistors is electrically coupled to opposite ends of the first sensor,
the second sensor is adjacent to a second portion of the peripheral edge of the die,
the second pair of sensor access transistors is electrically coupled to opposite ends of the second sensor, and
obtaining the first electrical parameter is performed while the first pair of sensor access transistors is on and all other sensor access transistors are off;
obtaining a second electrical parameter associated with the second sensor while the second pair of sensor access transistor is on and all other sensor access transistors are off; and
determining whether or not a first crack in the die is adjacent to or extends through the first sensor or whether or not a second crack in the die is adjacent to or extends though the second sensor.

13. The method of claim 12, further comprising:

placing a first voltage difference across the first sensor, wherein obtaining the first electrical parameter comprises measuring a first current associated with the first sensor; and placing a second voltage difference across the second sensor, wherein obtaining the second electrical parameter comprises measuring a second current associated with the second sensor, wherein determining is performed using the first current and the second current.

14. The method of claim 12, further comprising:

injecting a first current into the first sensor, wherein obtaining the first electrical parameter comprises measuring a first voltage drop associated with the first sensor; and injecting a second current into the second sensor, wherein obtaining the second electrical parameter comprises measuring a second voltage drop associated with the second sensor, wherein determining is performed using the first voltage drop and the second voltage drop.

15. The method of claim 12, further comprising:

obtaining a third electrical parameter associated with a third sensor while a third pair of sensor access transistors is on, wherein:

the third sensor is adjacent to a third portion of the peripheral edge of the die, the third pair of sensor access transistors is electrically coupled to opposite ends of the third sensor, a fourth sensor is adjacent to a fourth portion of the peripheral edge of the die, a fourth pair of sensor access transistors is electrically coupled to the fourth sensor and is not electrically connected to the third sensor, and obtaining the third electrical parameter is performed while the third pair of sensor access transistors is on and all other sensor access transistors are off;

obtaining a fourth electrical parameter associated with the fourth sensor while the fourth pair of sensor access transistors is on and all other sensor access transistors are off; and determining whether or not a third crack in the die is adjacent to or extends through the third sensor or whether or not a fourth crack in the die is adjacent to or extends through the fourth sensor.

16. The method of claim 15, wherein:

the first portion of the peripheral edge is adjacent to a first corner of the die, the second portion of the peripheral edge is adjacent to a second corner of the die, the third portion of the peripheral edge is adjacent to a third corner of the die, the fourth portion of the peripheral edge is adjacent to a fourth corner of the die, and the first corner is opposite the fourth corner, and the second corner is opposite the third corner.

17. The method of claim 16, wherein:

obtaining the first electrical parameter is performed while current flows through the first sensor and does not flow through any other sensor, obtaining the second electrical parameter is performed while current flows through the second sensor and does not flow through any other sensor, obtaining the third electrical parameter is performed while current flows through the third sensor and does not flow through any other sensor, and obtaining the fourth electrical parameter is performed while current flows through the fourth sensor and does not flow through any other sensor.

18. The method of claim 15, wherein any two or more of the first crack, the second crack, the third crack, and the fourth crack are different parts of a same crack.

19. The method of claim 12, wherein:

the first sensor and the second sensor are substantially identical to each other, and determining whether the first crack in the die is adjacent to or extends through the first sensor or the second crack in the die is adjacent to or extends through the second sensor comprises comparing the first electrical parameter and the second electrical parameter to each other.

20. The method of claim 12, wherein determining whether the first crack in the die is adjacent to or extends through the first sensor or the second crack in the die is adjacent to or extends through the second sensor comprises:

comparing the first electrical parameter to a first reference value corresponding to the first sensor, and comparing the second electrical parameter to a second reference value corresponding to the second sensor.

21. The method of claim 12, wherein the method is performed:

before packaging the die, before attaching the die or a packaged die including the die to an other die or a printed wiring board or a circuit board, after attaching the die or the packaged die to the other die or the printed wiring board or the circuit board and before installing other die or the printed wiring board or the circuit board into a first electrical system, or on the die, where a second electrical system that includes (1) the die or the packaged die attached to (2) the other die or the printed wiring board or the circuit board.

* * * * *